US011711270B1

(12) United States Patent
Pelekhaty et al.

(10) Patent No.: US 11,711,270 B1
(45) Date of Patent: Jul. 25, 2023

(54) CREATING AN OPTIMAL NODE INTERCONNECT TOPOLOGY GIVEN CERTAIN CONSTRAINTS

(71) Applicant: Ciena Corporation, Hanover, MD (US)

(72) Inventors: Vladimir Pelekhaty, Baltimore, MD (US); Michael Y. Frankel, Pikesville, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/723,829

(22) Filed: Apr. 19, 2022

(51) Int. Cl.
*G06F 15/16* (2006.01)
*H04L 41/12* (2022.01)
*H04L 43/045* (2022.01)

(52) U.S. Cl.
CPC ............ *H04L 41/12* (2013.01); *H04L 43/045* (2013.01)

(58) Field of Classification Search
CPC .............................. H04L 41/12; H04L 43/045
See application file for complete search history.

(56) References Cited

U.S. PATENT DOCUMENTS

| | | | |
|---|---|---|---|
| 4,875,207 A * | 10/1989 | Van Twist | G06F 15/17343 370/406 |
| 6,243,175 B1 | 6/2001 | Pelekhaty | |
| 6,795,607 B1 | 9/2004 | Archambault et al. | |
| 7,184,215 B2 | 2/2007 | Pelekhaty | |
| 7,415,208 B1 | 8/2008 | Haggans et al. | |
| 7,853,156 B2 | 12/2010 | Grigoryan et al. | |
| 7,853,157 B2 | 12/2010 | Grigoryan et al. | |
| 8,005,375 B2 | 8/2011 | Frankel | |
| 8,625,994 B2 | 1/2014 | Archambault et al. | |
| 8,699,880 B2 | 4/2014 | Grigoryan et al. | |
| 8,977,125 B2 | 3/2015 | Grigoryan et al. | |
| 9,191,117 B2 | 11/2015 | Alexander et al. | |
| 9,270,405 B2 | 2/2016 | Blair et al. | |
| 9,374,166 B2 | 6/2016 | Mateosky et al. | |
| 9,509,410 B2 | 11/2016 | Mateosky et al. | |
| 9,515,767 B2 | 12/2016 | Frankel et al. | |
| 9,551,836 B2 | 1/2017 | Frankel et al. | |
| 10,141,926 B2 | 11/2018 | Frankel et al. | |
| 10,142,092 B2 | 11/2018 | Pelekhaty et al. | |
| 10,171,169 B2 | 1/2019 | Frankel et al. | |
| 10,194,221 B2 | 1/2019 | Frankel et al. | |
| 10,200,305 B2 | 2/2019 | Frankel et al. | |

(Continued)

*Primary Examiner* — Padma Mundur
(74) *Attorney, Agent, or Firm* — Baratta Law PLLC; Lawrence A. Baratta, Jr.

(57) ABSTRACT

Systems and methods for creating network topology plans are provided. A method, according to one implementation, includes receiving a first constraint (number of nodes) to be set in a graph (under construction). The graph, when complete, is configured to include nodes and interconnections so as to enable each node to reach any other node via one or more interconnections. The method also includes receiving a second constraint (number of degrees) to be set with respect to each node and which defines the maximum number of interconnections that can be connected to each node. Upon determining that the graph is developed to an extent where each node is connected to at least one interconnection and every node is reachable by any other node, the method further includes performing functions to improve metrics related to a hop count that represents a number of interconnections needed for one node to reach another.

20 Claims, 18 Drawing Sheets

(56) References Cited

U.S. PATENT DOCUMENTS

| | | |
|---|---|---|
| 10,212,496 B2 | 2/2019 | Frankel et al. |
| 10,313,014 B2 | 6/2019 | Frankel et al. |
| 10,313,021 B1 | 6/2019 | Frankel et al. |
| 10,404,365 B2 | 9/2019 | Frankel et al. |
| 10,476,815 B2 | 11/2019 | Frankel et al. |
| 10,715,888 B2 | 7/2020 | Swinkels et al. |
| 10,749,602 B2 | 8/2020 | Charlton et al. |
| 11,026,001 B1 | 6/2021 | Frankel et al. |
| 2005/0100271 A1 | 5/2005 | Frankel |
| 2012/0008945 A1* | 1/2012 | Singla ................ H04J 14/0204 398/45 |
| 2012/0281740 A1 | 11/2012 | Fujita et al. |
| 2013/0044588 A1* | 2/2013 | Kogge ................ H04L 45/48 370/254 |
| 2019/0052535 A1* | 2/2019 | Huang ................ H04L 45/02 |
| 2019/0182180 A1 | 6/2019 | Frankel et al. |
| 2020/0236064 A1 | 7/2020 | Frankel et al. |
| 2021/0058685 A1 | 2/2021 | Frankel et al. |
| 2021/0075746 A1 | 3/2021 | Frankel et al. |

* cited by examiner

A(1,1) = [6,10]; A(1,2) = [11,12,14,3]; A(2,2) = [4,12];

A(1,1) = [7,15;1,9]; A(1,2) = [1,4,6,10;0,1,4,6]; A(2,2) = [8,9;7,8];

CREATING AN OPTIMAL NODE INTERCONNECT TOPOLOGY GIVEN CERTAIN CONSTRAINTS

TECHNICAL FIELD

The present disclosure generally relates to networking systems and methods. More particularly, the present disclosure relates to systems and methods for creating network topologies within specific network constraints for optimizing the efficiency and cost of network node-interconnection designs.

BACKGROUND

FIG. 1A is a diagram showing an example of a "directed graph" 10 that may be constructed according to conventional graph theory. In graph theory, the term "graph" is used to describe a geometrical structure or mesh configuration. The geometrical structure of the directed graph 10 includes vertices 12 (e.g., dots, nodes, points, etc.) and edges 14 (e.g., links, lines, connections, etc.) arranged in a mesh configuration. According to this model, the directed graph 10 includes vertices 12 connected via edges 14 in a manner that is unidirectional. That is, there is a specific directionality to each of the distinct edges 14 that does not follow any predetermined pattern. This is indicated by arrowed edges 14 indicating the directionality.

FIG. 1B, on the other hand, is a diagram showing an example of an "undirected graph" 20 that may be constructed according to conventional graph theory. In this model, the undirected graph 20 includes vertices 22 connected via edges 24 arranged in a bidirectional manner. That is, each edge 24 does not have its own directionality, but instead follows a predetermined pattern. For example, the specific pattern of the undirected graph 20 of FIG. 1B includes a construction whereby each vertex 22 is connected to its nearest neighbor via edges 24, which thereby forms a ring topology. Also, in this example, each vertex 22 is connected to an oppositely-arranged vertex 22 that is positioned the farthest "distance" away (e.g., five vertices away, or five "hops" away). In this sense, the term "distance" does not necessarily refer to a physical or geometrical distance, but may refer to a number of hops or relational distance based on the relationships among the vertices 22.

In the context of communications networks, for example, graph theory may be considered when planning a network topology. The network topology, in this case, include nodes (e.g., vertices) and node-connecting links (e.g., edges) arranged in certain patterns. For instance, the network topology may include either a directed graph pattern (similar in nature to the directed graph 10 of FIG. 1A) or an undirected graph pattern (similar in nature to the undirected graph 20 of FIG. 1B).

It may be noted that the creation of a plan (or blueprint) to deploy a network (on any scale) is naturally constrained by the number of nodes intended to be deployed in the network and also the number of ports (e.g., degrees) that each respective node includes. That is, the number of degrees of a node dictates how many other nodes it can be connected to. For example, if each node is configured with four degrees, then each node is able to be connected directly (via suitable links) to up to four other nodes. Another constraint in network topology planning may be a desired maximum number of hops or a desired average number of hops from one node to another along one or more links.

Network topologies are usually generated by standard "hill climbing" techniques. Alternatively, network topology planning may be derived from extensive resources of graph theoretical applications, such as, for example, using a strategy defined in the table of the orders of the largest known graphs, which includes solutions to the undirected degree/diameter problem at Combinatorics Wiki: http://combinatoricswiki.org/wiki/The_Degree_Diameter_Problem_for_General_Graphs.

However, conventional "hill climbing" procedures are slow and inefficient. Also, these conventional strategies commonly fail to find a global optimum and subsequently resort to numerous repetitive attempts (i.e., "shotgun hill climbing"). Graph theoretical resources, despite numerous and impressive fits, often lack the flexibility to satisfy the actual requirements and constraints of custom network design.

Therefore, there is a need in the field of network topology planning to create a suitable network model that is able to meet certain criteria or constraints. Particularly, there is a need to plan network topologies by using creation strategies that utilize node clustering techniques and fine-tuning techniques for targeted functionality.

BRIEF SUMMARY

The present disclosure focuses on systems, methods, and non-transitory computer-readable media for creating a graph (e.g., network topology plan) within certain constraints. According to one implementation, a process may include the step of receiving a first constraint defining a number of nodes (n) to be set in a graph that is to be created. The graph (under construction) is configured to include a plurality of nodes and a plurality of interconnections (when complete). Each interconnection is configured to connect a pair of nodes to one another. Also, the graph is configured to enable each node to "reach" any other node via one or more interconnections. Furthermore, the process may also include the step of receiving a second constraint defining a number of degrees (d) to be set with respect to each node. The number of degrees d defines the maximum number of interconnections that can be connected to each node. Note, the number of degrees (d) can be a different value for different nodes. Upon determining that the graph is developed to an extent where each node is connected to at least one interconnection and every node is reachable by any other node, the process may be configured to perform one or more functions with respect to the graph to improve one or more metrics related to hop count. The hop count, for example, represents a number of interconnections needed for one node to reach another node.

The graph, according to various embodiments, may be a network topology plan for defining a topology of a communication network. For example, the communication network may be configured to include a plurality of network elements and a plurality of links, where the network elements may be represented by the nodes in the graph and the links may be represented by the interconnections in the graph. The one or more metrics related to hop count may include a first metric and/or a second metric. The first metric, for example, may be related to an average distance, in hops, between each pair of nodes in the graph. The second metric, for example, may be defined as a diameter k and may be related to a maximum distance, in hops, between any pair of nodes in the graph. The step of improving the one or more metrics may include decreasing the first metric and/or decreasing the second metric.

The step of performing the one or more functions with respect to the graph may include the steps of a) dividing the nodes into a number of identical clusters (C), and b) replicating actions applied to one cluster to the corresponding nodes, intra-cluster interconnections, and inter-cluster interconnections with respect to the other clusters. The step of dividing the nodes into the number of identical clusters further includes dividing the identical clusters C into one or more levels of identical sub-clusters, sub-sub-clusters, sub-sub-sub-clusters, etc.

The process may further be defined whereby the step of performing the one or more functions with respect to the graph may also include creating a regular graph, where the regular graph may be defined by a situation where each node is connected to exactly d neighboring nodes. In some embodiments, the step of performing the one or more functions with respect to the graph may further include a) cutting a plurality of existing interconnections in the graph, thereby vacating degrees of multiple nodes, and b) re-wiring one or more mutated interconnections to the degrees vacated by cutting the existing interconnections. In some embodiments, the step of performing the one or more functions with respect to the graph may further include a) dividing the nodes into a number of identical clusters (C) and b) replicating cutting and re-wiring applied to one cluster to the corresponding nodes and interconnections of the other clusters. The step of cutting the plurality of existing interconnections in the graphs may include randomly selecting the interconnections to cut.

In some embodiments, the step of performing the one or more functions with respect to the graph may include adding one or more extra interconnections between one or more pairs of nodes, which would thereby create an excess of interconnections with respect to degrees of multiple nodes. Then, the process may include removing one or more interconnections from nodes having excess interconnections to return to the regular number of degrees d for each node, i.e., graph is connected.

As mentioned above, the step of determining that the graph is developed to an extent where each node is connected to at least one interconnection and every node is reachable by any other node may include a) starting the graph with no interconnections, and b) adding one or more interconnections at a time until the graph is developed to the extent where each node is connected to at least one interconnection and every node is reachable by any other node, i.e., graph is connected. The step of determining that the graph is developed to an extent where each node is connected to at least one interconnection and every node is reachable by any other node may alternatively include starting the graph with a ring topology, a circulant architecture, or other suitable arrangement.

The one or more metrics described above may be related to latency, link bandwidth, traffic load, reliability, effectiveness, an ability to operate after a fault is detected, path recovery time, monetary cost, and/or any suitable weighted combination of these factors. In some embodiments, the process may further include the step of performing a Genetic Algorithm (GA) with Simulated Annealing (SA) technique and/or a tabu searching technique to obtain a more globally efficient graph.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1A:
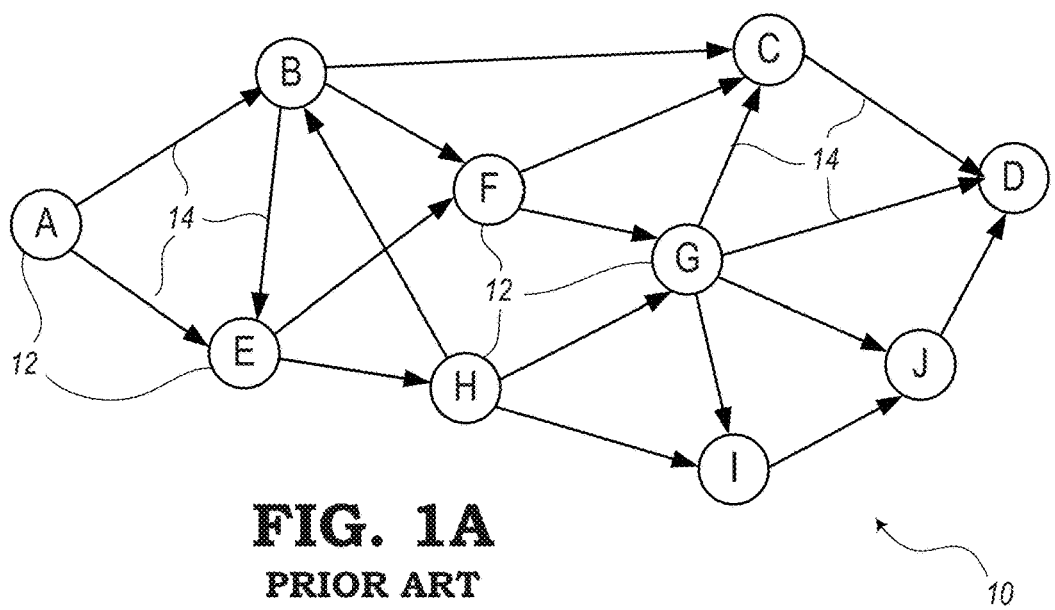
FIG. 1A is a directed graph according to conventional graph theory.
Figure 1B:
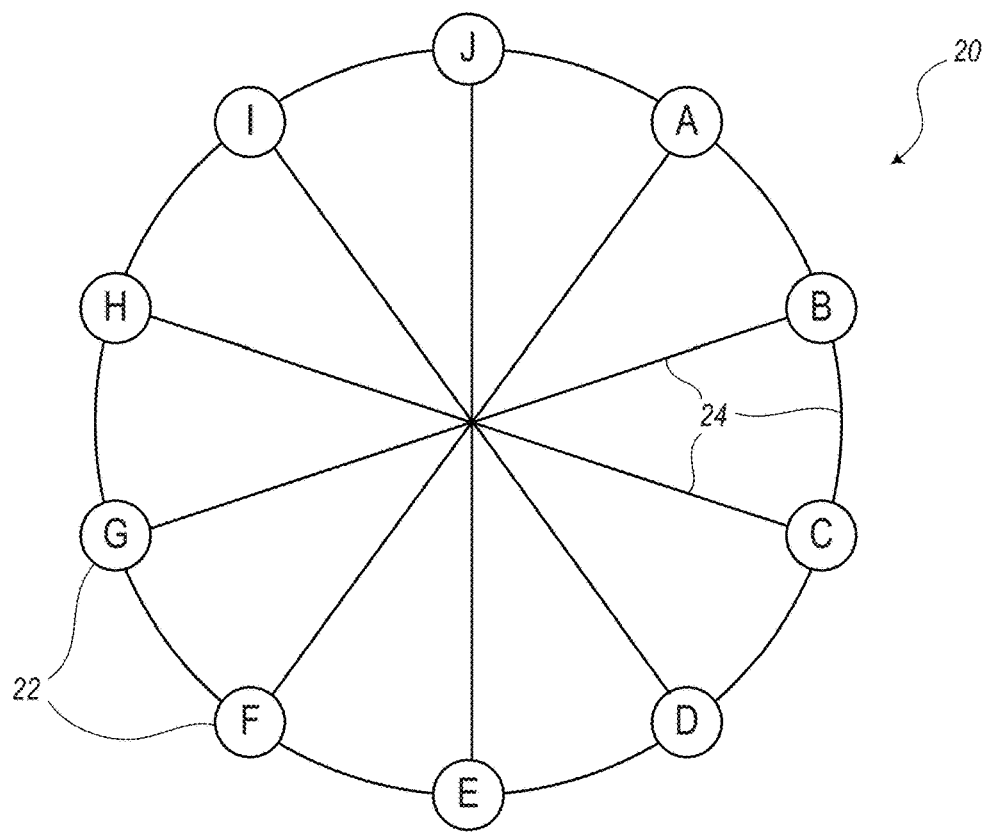
FIG. 1B is an undirected graph according to conventional graph theory.

Legacy terrestrial communication network architectures were primarily based around spokes connecting distributed edge nodes to a more centralized metro hub, with hubs interconnected via a physical ring for route diversity and protection. However, a proliferation of new use cases and applications around Internet of Things (IoT), Multi-Access Edge Compute (MEC), Radio Access Networks (RAN), mobile network migration from 4G to 5G to nascent 6G concepts, etc., are driving a need for a radical rethinking of network architectures. More specifically, mesh connectivity (i.e., nodes having multiple paths to other nodes) is considered to be an essential configuration for efficient utilization of resources such as Wireless Antennas, RAN components, CPUs, Memory and Interconnect Bandwidth, etc. Furthermore, mesh connectivity is typically needed for optimizing user and application Quality of Service (QoS) in terms of reduced latency, improved resilience to failures, fast recovery, etc.

Dynamic and programmable mesh connectivity is enabled by new hardware and software. For example, NG Radio antennas allow steerable beamforming, end-users are able to perform multi-homing to LTE and 5G infrastructure, and dense antenna locations allow for selectable device homing. Private IoT networks like ones used in factory automation, transportation hub coverage (e.g., in seaports, rail terminals, warehouse distribution centers, etc.) may also benefit from mesh-type network connections.

Fiber connectivity in network systems is pushing further out to network edges and provides more symmetric bandwidth connections. Dynamically reconfigurable optical networks are enabled by Colorless & Directionless Reconfigurable Optical Add/Drop Multiplexers (ROADMs) and wavelength-tunable modems. Some software is able to provide rich telemetry that describes deployed resources, current state, and various performance metrics. Various systems may also provide Application Programming Interfaces (APIs) for programmatic control of applications, resources, and connectivity.

Dense Low Earth Orbit (LEO) satellite networks also provide a natural platform to explore mesh interconnect topologies. Given the unique requirements of dense LEO satellite networks, which may include frequent but predictable changes in satellite interconnections as well as fixed sources and sinks of ground-based data, some solutions have been developed.

Mesh-type connectivity is becoming more prevalent across the full range of network markets. Edge networks, especially ones targeting Internet of Things (IoT) and 5G site interconnects, are typically highly-meshed.

End points may share their resource availability and may be incentivized to share their resources across the external user base. Dynamic edge network architecture for IoT device, with shared resources and optimized mesh connections, is described in Lorenzo et al, "A Robust Dynamic Edge Network Architecture for the Internet-of-Things," the contents of which are incorporated by reference herein. Network slicing optimization is also described in D'Oro et al., "SI-EDGE: Network Slicing at the Edge," Institute for the Wireless Internet of Things, Northeastern University, Boston, Mass., USA, Department of Information Engineering, University of Padova, Italy, 2 May 2020, the contents of which are incorporated by reference herein. Multi-access edge computing technology is described in Filali et al., "Multi-Access Edge Computing: A Survey," INTERLAB, Engineering Faculty, Université de Sherbrooke, Sherbrooke, QC J1K 2R1, Canada, ENSIAS, Mohammed V University, Rabat 10056, Morocco, Qatar University, Doha, Qatar, Oct. 27, 2020, the contents of which are incorporated by reference herein.

However, there is a need for systems and methods for determining an optimal network interconnection topology for interconnecting a number of nodes to be used in a network. The planned network topology may be optimized around a set of metrics and may be configured to satisfy a set of constraints. The embodiments of the present disclosure are configured to target reprogrammable networks, networks in a planning stage, and/or quasi-static (i.e., slowly varying) networks. In some embodiments, the systems of the present disclosure may be incorporated in a centralized controller for controlling the interconnections according to a newly-created network topology plan.

The metrics, around which a specific topology is optimized, are expected to be dependent on the specific network being considered, the end-users, use cases for the network, etc. For example, some of these metrics may include hop count, latency, an ability to operate after a specified number of failures, a recovery time, a cost of associated networking hardware, etc. Also, another metric may be associated with a weighted combination of two or more of these metrics. It should also be noted that the topology may be calculated in order to satisfy a set of predefined constraints. For example, some constraints may include available interconnect bandwidth, node geographic proximity, interconnect link availability, bandwidth, traffic matrix overlays, etc.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

General Computing System

Figure 2:
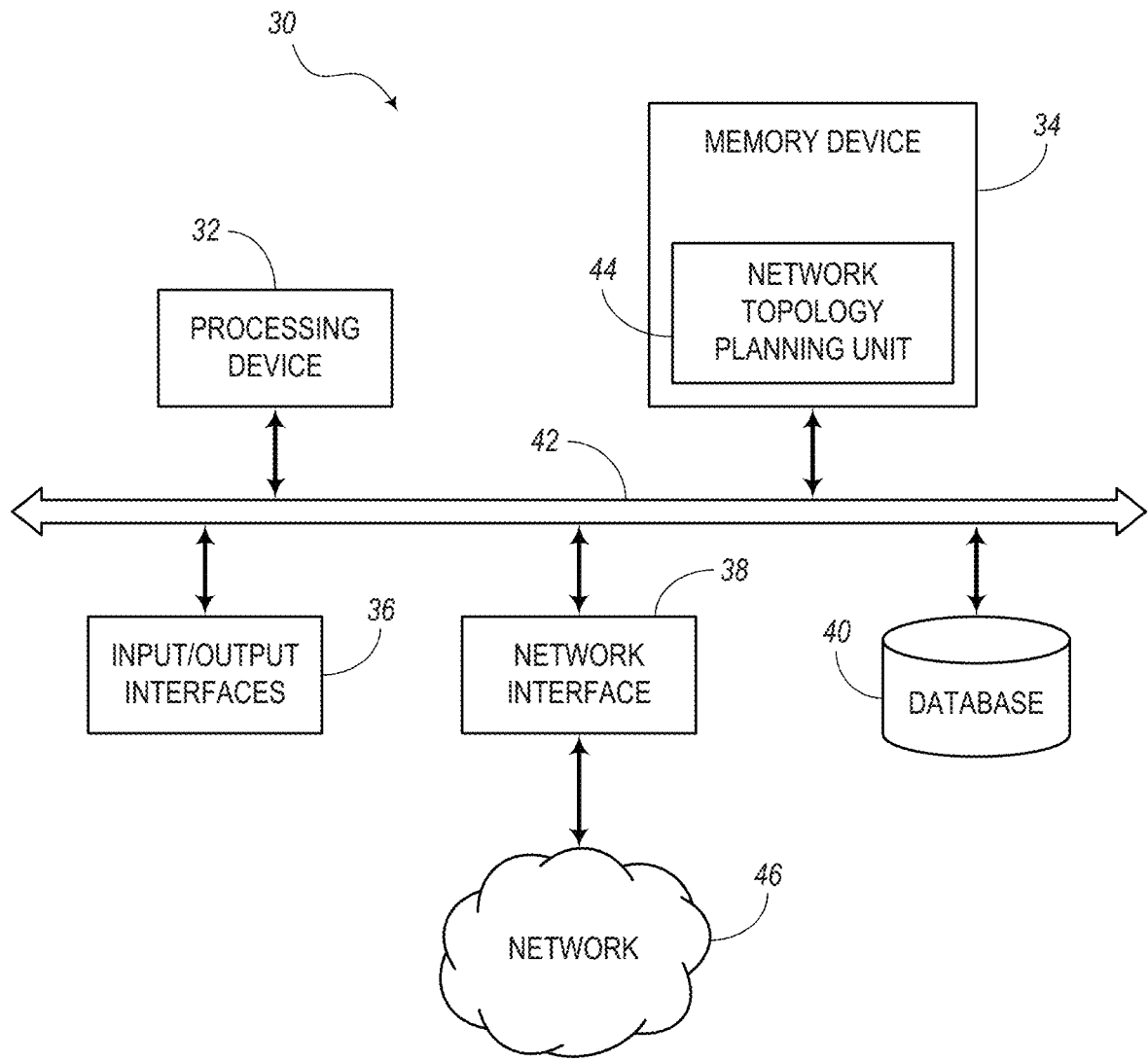
FIG. 2 is a block diagram illustrating a computing device for creating a network topology plan within certain constraints, according to various embodiments of the present disclosure.

FIG. 2 is a block diagram illustrating an embodiment of a computing device 30 for creating a network topology plan, such as one that conforms to certain constraints. The computing device 30 may be configured to operate in any suitable environment. For example, the computing device 30 may be part of a network that is being considered for node-interconnection optimization. Also, the computing device 30 may operate in a control plane with respect to a network of interest and may thereby provide control or deployment instructions for interconnecting the nodes based on a created network topology plan. In still other embodiments, the computing device 30 may be independent of the network itself and may create or compute a specific network topology plan, whereby this plan can then be used to construct a new network or make changes to an existing network, as needed, to optimize or improve the efficiency and/or cost of communicating signals throughout the network.

In the illustrated embodiment, the computing device 30 may be a digital computing device that generally includes a processing device 32, a memory device 34, Input/Output (I/O) interfaces 36, a network interface 38, and a database 40. It should be appreciated that FIG. 2 depicts the computing device 30 in a simplified manner, where some embodiments may include additional components and suitably configured processing logic to support known or conventional operating features. The components (i.e., 32, 34, 36, 38, 40) may be communicatively coupled via a local interface 42. The local interface 42 may include, for example, one or more buses or other wired or wireless connections. The local interface 42 may also include controllers, buffers, caches, drivers, repeaters, receivers, among other elements, to enable communication. Further, the local interface 42 may include address, control, and/or data connections to enable appropriate communications among the components 32, 34, 36, 38, 40.

It should be appreciated that the processing device 32, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 32 may also include or utilize stored program instructions (e.g., stored in hardware, software, and/or firmware) for control of the computing device 30 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 34 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 34 may incorporate electronic, magnetic, optical, and/or other types of storage media. The memory device 34 may have a distributed architecture, where various components are situated remotely from one another, but can be accessed by the processing device 32.

The memory device 34 may include a data store, database (e.g., database 40), or the like, for storing data. In one example, the data store may be located internal to the computing device 30 and may include, for example, an internal hard drive connected to the local interface 42 in the computing device 30. Additionally, in another embodiment, the data store may be located external to the computing device 30 and may include, for example, an external hard drive connected to the Input/Output (I/O) interfaces 36 (e.g., SCSI or USB connection). In a further embodiment, the data store may be connected to the computing device 30 through a network and may include, for example, a network attached file server.

Software stored in the memory device 34 may include one or more programs, each of which may include an ordered listing of executable instructions for implementing logical functions. The software in the memory device 34 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 32), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 32 or other suitable circuitry or logic). For example, when executed, the instructions may cause or enable the processing device 32 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 32), or any suitable combination thereof. Software/firmware modules may reside in the memory device 34, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 36 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 36 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 38 (which may be optional in some embodiments) may be used to enable the computing device 30 to communicate over a network 46, such as the network being considered according to the systems and methods of the present disclosure. The network considered for optimization of node-interconnections may include a Wide Area Network (WAN), a Local Area Network (LAN), and the like. The network interface 38 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 38 may include address, control, and/or data connections to enable appropriate communications on the network 46.

Furthermore, the computing device 30 may include a network topology planning unit 44 for creating a plan for the topology of a network, whereby the topology includes specific interconnections of nodes via a number of links. The network topology planning unit 44 may be configured in any suitable combination of hardware, software, firmware, etc. When configured in software or firmware, the network topology planning unit 44 may be stored in the memory device 34 and/or database 40. When configured in hardware, the network topology planning unit 44 may be arranged in the processing device 32. The network topology planning unit 44 may include computer logic or instructions configured to enable the processing device 32 to perform certain functionality related to the creation of network topology plans or designs. Essentially, a result of executing the instructions of the network topology planning unit 44 may be a blueprint or architecture of a network topology defining nodes and interconnections between the nodes.

The "quality" of these planned interconnection networks may be defined by the efficiency and cost of the designs. Efficiency of a network essentially depends on the speed and reliability of the interconnections. Speed (and the related latency) of interconnections may be based on at least two factors: a) the number of hops between the switching nodes and b) the physical length of the interconnecting links involved. In this aspect, the action of minimizing the maximum number of hops (or the average number of hops) becomes a key task.

It may be noted, however, that minimizing the physical length of the interconnecting links is feasible for a Local Area Network (LAN) or an intra-domain Autonomous Systems (AS) (e.g., Data Center (DC)) by optimizing the floorplan of the placement of switches within the DC, exploring the 3D "space-plan" architecture, etc. On the other hand, terrestrial and satellite networks usually lack this opportunity and hence need to be optimized based on specific constraints (e.g., geographic placement of nodes for terrestrial systems, line-of sight parameters, power limit ranges, etc. for satellite systems).

The network topology planning unit 44 may be configured to accommodate these constraints by a) considering various metrics of the links (also referred to as the weight of an edge in graph theory), b) supplementing or even replacing the simple hop count with a composite metric related to the specific constraints, etc. For example, composite metrics may include a) link bandwidth, b) delay, c) (monetary) cost, d) load, e) reliability, etc. In the case of a satellite network, for example, when two satellites are out of range, based on either of a line-of-sight or a power limitation, the metric can be set to infinity, thus effectively eliminating the possibility of this connection being considered for inclusion in the topology plan.

Flat topology networks are best positioned for cost and effectiveness as they may use all of the nodes' ports by optimally partitioning them as User-Network Interfaces (UNIs) and Network-Network Interfaces (NNIs). This allows the network topology planning unit 44 to achieve adequate performance characteristics with a much smaller number of switching nodes, which can thereby reduce cost. Another advantage is in building a flat network with identical single and fixed radix (degree) type of switches, resulting in further reduction of cost of building and maintaining the network.

One goal of the present disclosure, therefore, may be to design a highly efficient and low latency flat bidirectional network of n equal and fixed radix switching nodes. In terms of graph theory, the result may be a topology plan or design with simple connections (e.g., no parallel links, no loops, etc.), undirected graph, regular number of degrees (d) (or number of links per node), etc., with the lowest possible average distance (e.g., measured in hops) between nodes and the lowest possible diameter k (e.g., maximum distance between nodes in hops). Conventionally, graphs are denoted as n(d,k), a self-describing, short notation compounded from graph order n (where n is the number of nodes), degree d, and diameter k.

Adding One Link at a Time

Figure 3:
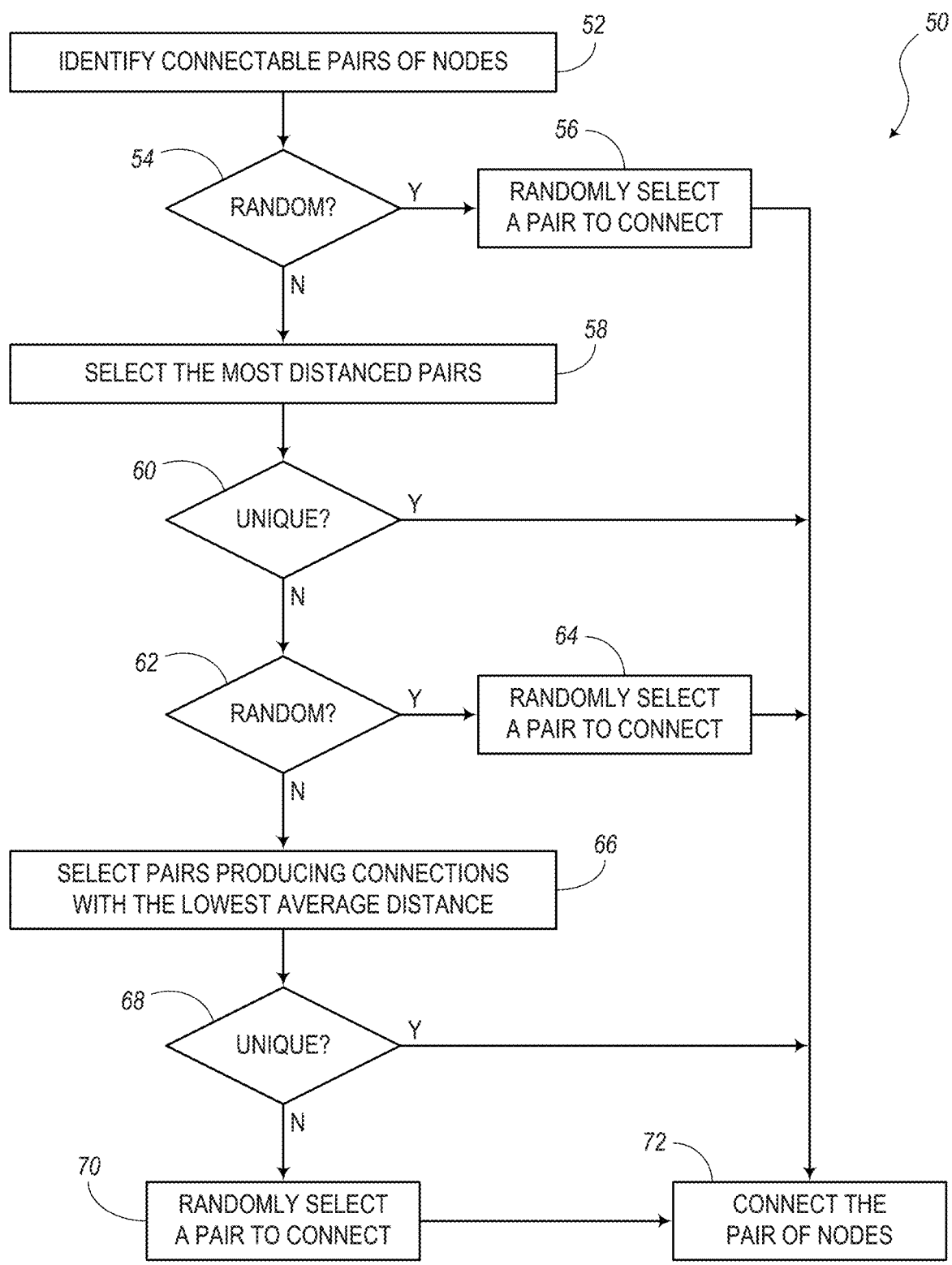
FIG. 3 is a flow diagram illustrating a process for creating a network topology plan by adding one link at a time, according to various embodiments.

FIG. 3 is a flow diagram illustrating an embodiment of a process 50 for creating a network topology plan by adding one link at a time. For example, the process 50 may be referred to as a "greedy hill climbing" technique. The process 50 is a network topology planning technique for adding links and can be performed when a network is under-connected (i.e., at least some of the nodes include at least some unconnected links). The process 50 may represent the simplest and most straightforward way to build a network from the ground up, starting with a completely disjoint cluster of nodes and linking together the connectable pairs of nodes. A pair of nodes can be considered to be connectable if a) they are mutually disjoint and b) they have unutilized links available for making a connection. It would take nd/2 links (where n=the number of nodes and d=the number of degrees of each node) to be added to complete the network (i.e., assuming n and d are not both odd). Thus, the completion of the network plan can be performed by repeating the simple algorithmic rules nd/2 times.

As illustrated, the process 50 includes identifying the connectable pairs of nodes, as indicated in block 52. If a random action is to be performed, as indicated in decision diamond 54, the process 50 includes randomly selecting a pair of nodes to connect, as indicated by block 56, and then going to block 72. Otherwise, the process 50 proceeds to block 58, which includes the step of selecting the most distanced pairs. If a unique action is to be performed, as indicated in decision diamond 60, the process 50 proceeds to block 72. Otherwise, the process 50 proceeds to decision diamond 62.

Decision diamond 62 includes the step of determining if a random action is to be performed. If so, the process 50 proceeds to block 64, which includes the step of randomly selecting a pair of nodes to connected and then going to block 72. If not, the process 50 proceeds to block 66, which includes the step of selecting pairs of nodes producing connections with the lowest average distance. The process 50 then includes determining if a unique action is to be performed, as indicated in decision diamond 68. If so, the process 50 proceeds to block 72. Otherwise, the process 50 goes to block 70, which includes randomly selecting a pair to nodes to connect and then proceeding to block 72. Block 72 includes the step of connecting the pair of nodes according to any of the previous five node connection steps. The action of connecting the pair of nodes in this respect may be considered to be a planning step for virtually connecting nodes in a model (e.g., plan, design, etc.) and/or may include instructions or mechanisms to enforce the node connections as determined according to the plan or design.

Thus, there are five distinct ways to perform the connection between the nodes in the process 50, depending on combination of random selections (blocks 56, 64, 70) and calculated selections (blocks 58, 66) as determined by the decisions diamonds 54, 60, 62, 68. Perhaps the simplest and fastest way to select a connection is to just make a random selection among connectable pairs. However, this may be unlikely to produce an optimal (or improved) solution. Calculated decisions may involve the calculation of distances between the nodes, and, while they may produce more optimal solutions, the volume of computing steps required for large networks might be insurmountable. Thus, the process 50 of FIG. 3 provides a hybrid remedy that is an alternative to the purely random decision-making in this case and may be configured to simplify the technique for handling the excessively massive amounts of connectable pairs of nodes in a large network by allowing the random selection of a smaller and more manageable sub-set of connectable pairs.

Figure 4:
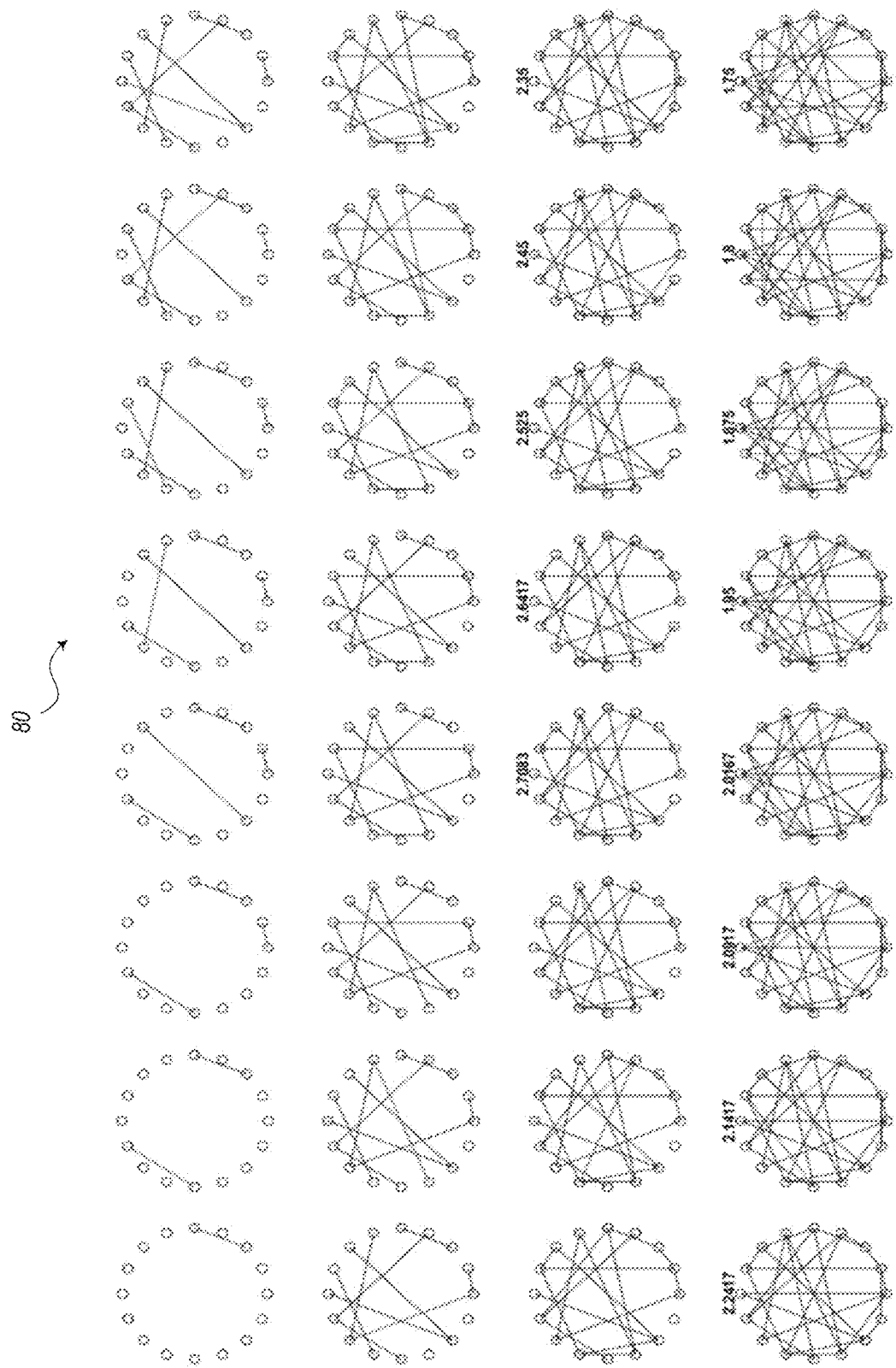
FIG. 4 is a diagram illustrating the progression of creating a network topology plan starting from completely disjoint cluster of nodes and adding one link at a time, according to various embodiments.

FIG. 4 is a diagram illustrating an example of a progression 80 of steps for creating a network topology plan by adding one link at a time (e.g., using the process 50 of FIG. 3 using random and/or other selections). In this example, a network includes 16 disjoint nodes to be connected according to a newly-conceived plan. Also, the progression 80 shows connections being added one at a time. Each of the 16 nodes is configured as a four-degree node for connecting to up four other nodes. As such, the network may include 32 links, where one link is added at a time. The most recently added link in each subplot is shown in red.

In the n(d,k) format, n is the number of nodes, d is the number of degrees of each node, and k is the diameter (or maximum number of hops between any node pair). The progression 80 of FIG. 4 results in an optimal scheme where k=3, meaning that there are no more than three hops between any two nodes in the network. This produces an optimal 16(4,3) network with diameter 3 (k=3) with average distance of just 1.75 hops. It may be noted that, since this progression 80 starts with the network where the nodes are completely disjoint from each other, the cluster of nodes inevitably remains disconnected with infinite average distance for a while until all the nodes are connected to at least one link and there is no discontinuity from one chain of links to another. In the example of FIG. 4, one of the nodes is not connected to a link after the first 19 links are added.

Therefore, this forces random connections between the pairs of connectable nodes. After the 20th connection (e.g., the minimum is n−1) is added, the nodes of the network are connected and the average distance will have a finite value. For example, the average distance (starting with the 20th connection) is indicated above each subplot.

Figure 5:
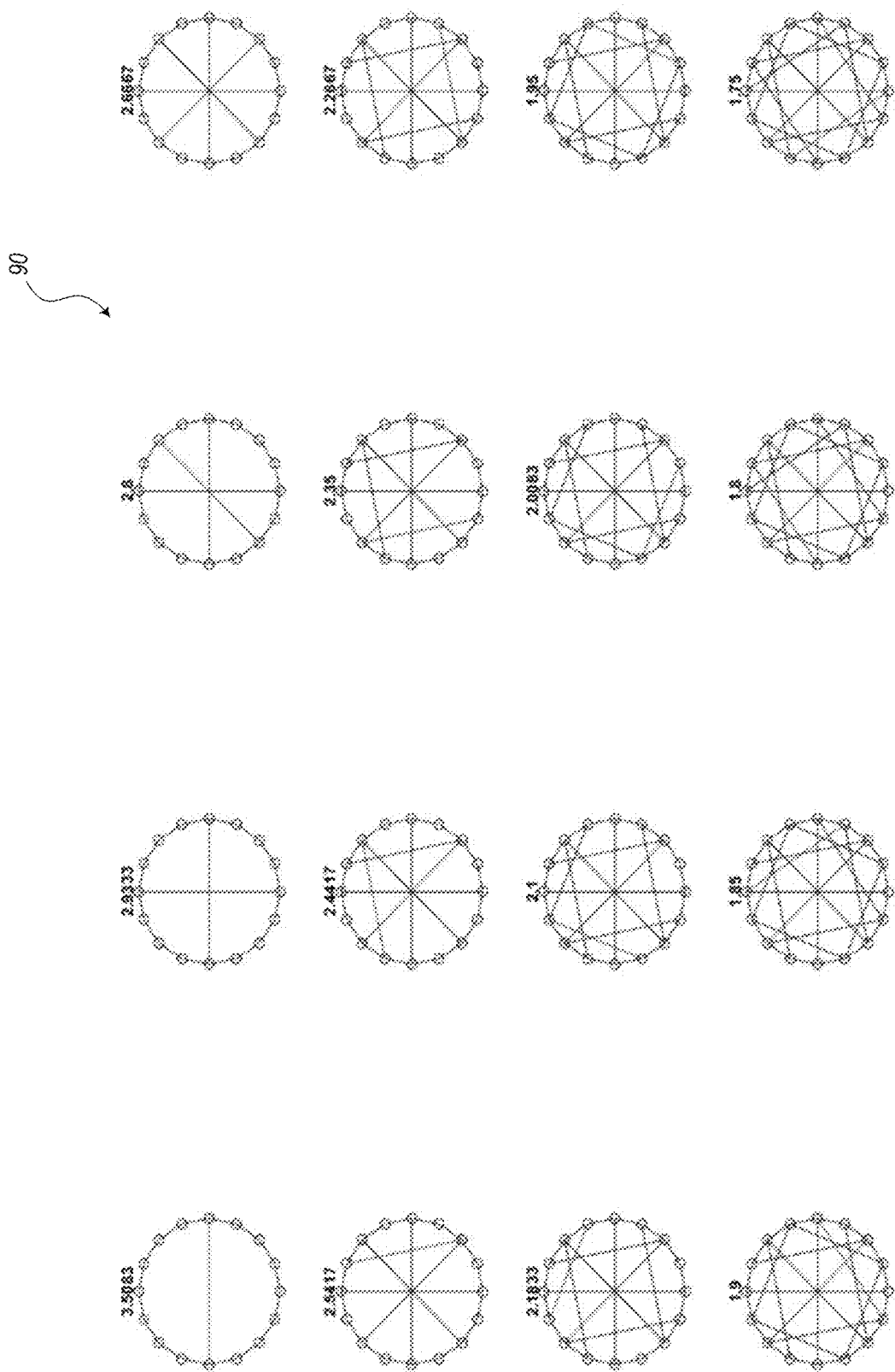
FIG. 5 is a diagram illustrating the progression of creating a network topology plan starting from a standard ring topology and adding one link at a time, according to various embodiments.

FIG. 5 is a diagram illustrating an example of a progression 90 of steps for creating a network topology plan starting from a standard ring topology and then adding one link at a time. Compared to FIG. 4, it may be noted that it is not necessary to start with completely disjoint cluster of nodes, but the network topology planning unit 44 may be configured to start with any suitable pre-built network to speed up the design process. For instance, in the progression 90 of FIG. 5, the network topology planning unit 44 may start with a ring topology, as shown, or any other pre-built structure. In this case, only 16 more links need to be added, resulting in a similarly optimal 16(4,3) diameter-3 network with an average distance of just 1.75 hops. In this example, however, the progression 90 includes chords spanning the ring.

Adding More Links at a Time

Figure 6:
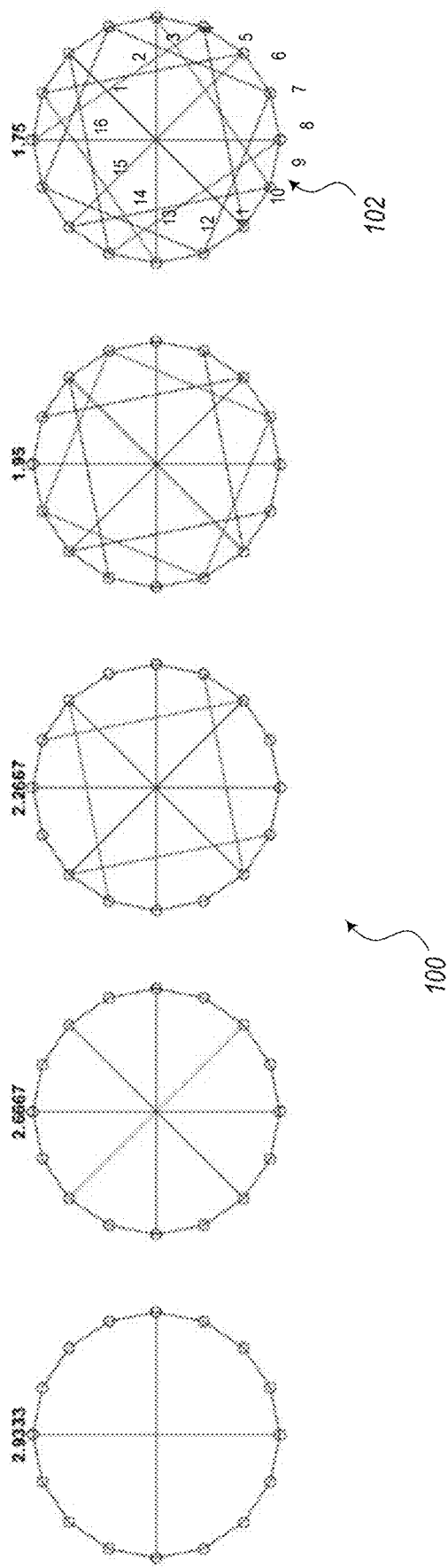
FIG. 6 is a diagram illustrating the progression of creating a network topology plan starting from a standard ring topology and adding multiple links at a time, according to various embodiments.

FIG. 6 is a diagram illustrating an example of a progression 100 of steps for creating a network topology plan starting from a standard ring topology and adding multiple links at a time. In this example, there are 16 nodes, where each node is connected to its two neighboring nodes and include two additional degrees for connection to two more nodes. It may be noted that the term "adding" in these embodiments refers to a virtual adding process where a link is considered for being added in a real-world network, based on the designed plan created by the network topology planning unit 44.

It should be noted that networks that are of real life's interest are much larger than the exemplary networks shown in these examples and may have thousands of nodes with much larger degree values, thus amounting to many tens of thousands of links to be added while building the network. In this sense, it may also be noted that by adding one link at a time, it may take an extremely long amount of time to accomplish a single build, not to mention performing multiple repetitions that may be needed for a more optimized system.

Therefore, to accelerate the process, the network topology planning unit 44 may be configured to utilize inherent and consequential symmetry of a network being designed (and/or built). The essence of the multiple-link-adding algorithm is as follows. When a pair of nodes arranged in the ring is calculated as getting a connection, new connections may also be replicated C times around the ring, where C may represent a number of clusters. For example, with 16 nodes and if each group of four nodes are considered to be repeated four times, then the adding of a connection can be repeated in a similar manner for the nodes at a position 360°/C around the ring in a ring topology. It may be assumed in this case that n is presumably divisible by C. It should be noted that angular "degrees" around the ring may instead to referred to as radians of a circle in order to avoid confusion with the terminology "degrees" used to describe the number of possible connections at each node. The progression 100 is able to accelerate the build of the network (i.e., C times faster) by adding C links (one for each cluster) at a time. Also, this produces a network with C-fold rotational symmetry.

In the example of FIG. 6, the network topology planning unit 44 is configured to create a similar 16(4,3) diameter-3 network using 16 four-degree nodes. In this case, the average distance again is 1.75 hops. The design is built starting with the ring topology and ending with the completed topology plan in just five steps and having four-fold rotational symmetry (C=4). The resulting network 102 has C identical clusters of nodes, and each similarly numbered node within every cluster has an identical "view" of the network. That is, the connections of corresponding nodes within each cluster are the same throughout the network.

Figure 7:
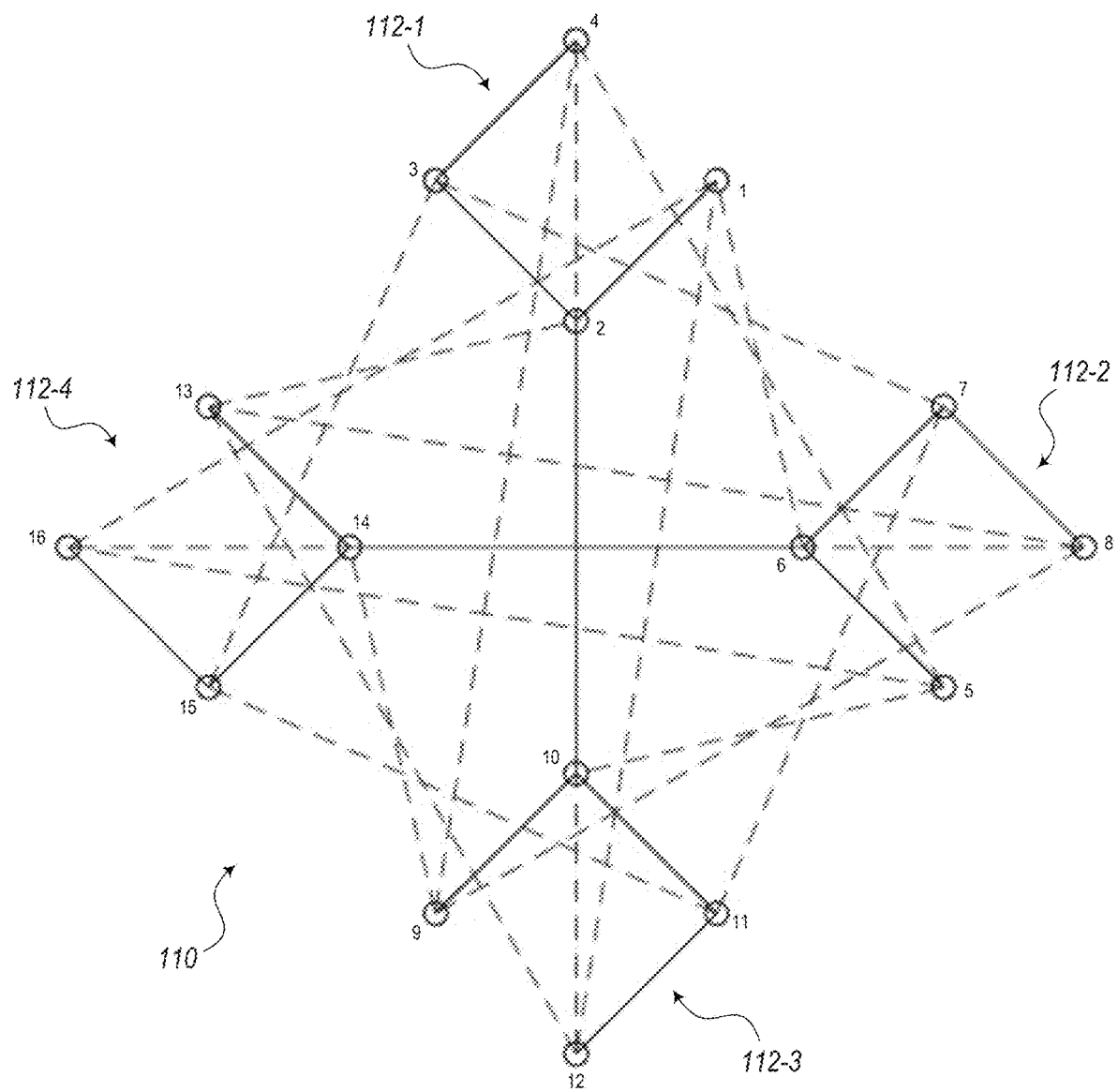
FIG. 7 is a diagram illustrating the completed network topology plan shown in FIG. 6 with the nodes grouped into clusters, according to various embodiments.

FIG. 7 is a diagram illustrating an example of a completed network topology plan 110, which is simply a redrawing of the resulting network 102 shown in FIG. 6. In this case, the network topology plan 110 is shown with the nodes grouped into clusters 112-1, 112-2, 112-3, 112-4. The nodes numbers 1-16 are indicated next to the nodes in FIG. 7 and may be considered to be the same as the node numbers 1-16 shown in the resulting network 102. For example, nodes 1-4 are part of cluster 112-1, nodes 5-8 are part of cluster 112-2, nodes 9-12 are part of cluster 112-3, and nodes 13-16 are part of cluster 112-4. Thus, the same optimal 16(4,3) network is redrawn with clusters emphasized as groups of four nodes with intra-cluster connections (i.e., connections within the same cluster) shown in blue and inter-cluster connections (i.e., connections between nodes in different clusters) shown in dashed red.

As defined herein, such a network plan having specific symmetry that includes a plurality of similar clusters of nodes can be referred to as a "compound" network. Also, as described in more detail below, compound networks may not only include a first level of clusters, but may also include one or more levels of sub-clusters, sub-sub-clusters, and so on, whereby each level includes a similar grouping of nodes.

Again, the 16 "ringed" nodes are connected by adding multiple links at a time (e.g., four links at a time). The network topology planning unit 44 may be configured to perform the process of adding C links at a time (e.g., C=4) by the following. After finding two connectable nodes (node "A" and node "B," where in this case for the sake of modal operations nodes are numbered 0 through n−1), the process includes:

For Clusters 1 through C
Nodes number A and number B are connected
A=A+n/C, mod n; B=B+n/C, mod n;
End for 1 through C Without any loss of generality, node number A can be chosen from within the first cluster, which is enforced by restriction A≤R=n/C, where R is the size of a cluster.

Figure 8:
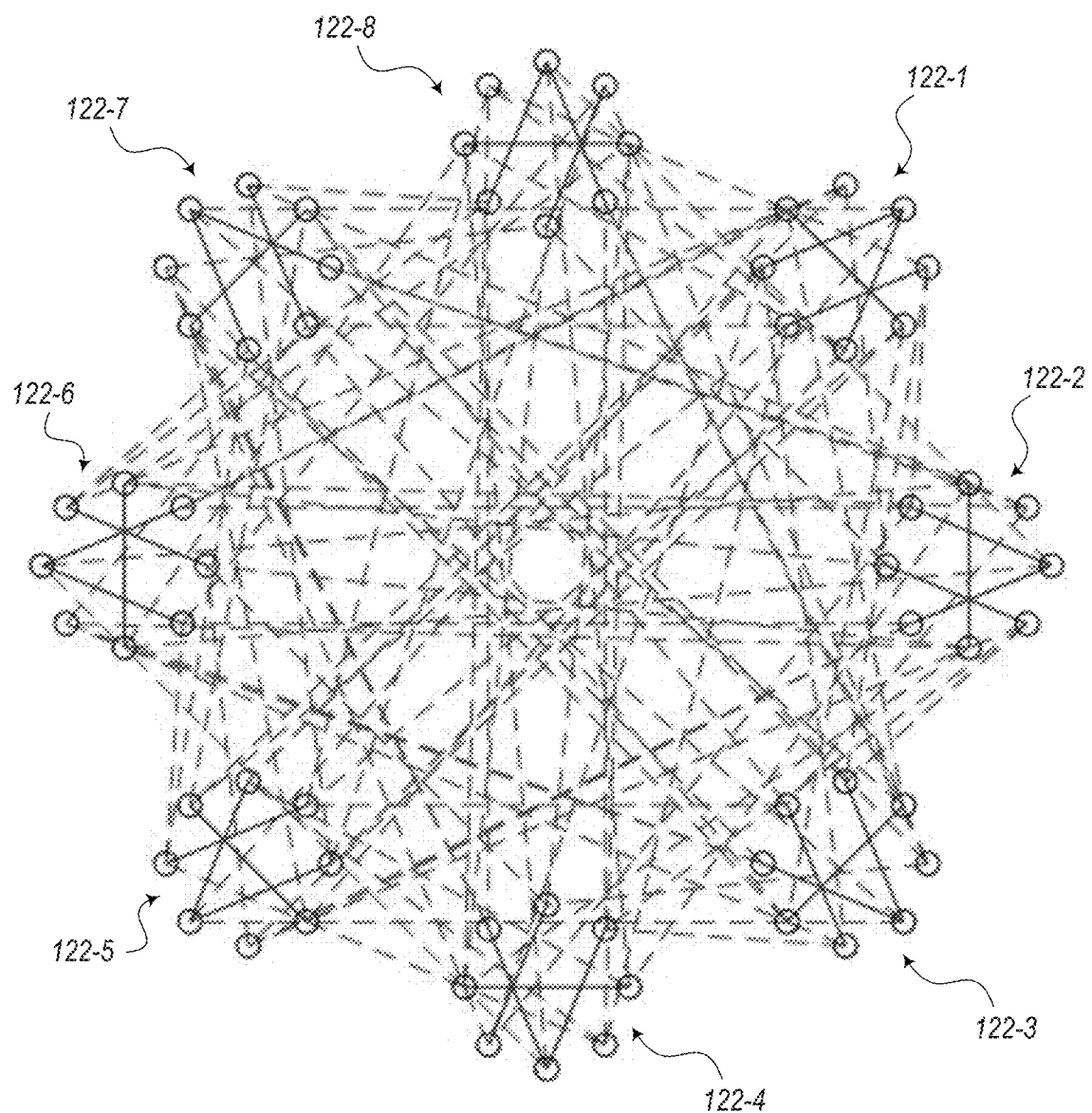
FIG. 8 is a diagram illustrating a completed network topology plan with intra-cluster and inter-clusters links, according to various embodiments.

FIG. 8 is a diagram illustrating an example of a completed network topology plan 120 with intra-cluster and inter-clusters links. Again, the network topology plan 120 can be referred to as a "compound" network, where, in this embodiment, the network topology plan 120 includes 64 initially disjoined nodes with both intra-cluster (blue) and inter-cluster (dashed red) links. The network topology plan 120 includes eight clusters 122-1, 122-2, 122-3, 122-4, 122-5, 122-6, 122-7, 122-8, where eight nodes are grouped within each cluster 122. Although the number of clusters and the number of nodes in each cluster are the same in the examples of FIGS. 7 and 8, it should be noted these numbers do not necessarily need to be same in accordance with other acceptable and reasonable implementations.

In some embodiments, the most straightforward way to build the network may be by adding C links at a time, starting with C completely disjoint clusters of nodes. This may be done by allowing both intra-cluster connections and inter-cluster connections to be added concurrently. In this example, there are 64 nodes, where each node includes four degrees for enabling connectivity with four other nodes. One initial constraint in this system may be that each node should be able to reach every other node in as little as four hops (i.e., a distance or diameter k of 4). The network topology plan 120 includes eight clusters 122 with eight nodes each. The intra-cluster connections are shown in blue, while inter-cluster connections are shown in red with dashed line. Both the intra-cluster connections and inter-cluster connections can be built concurrently, especially since they include rotational symmetry.

Figure 9:
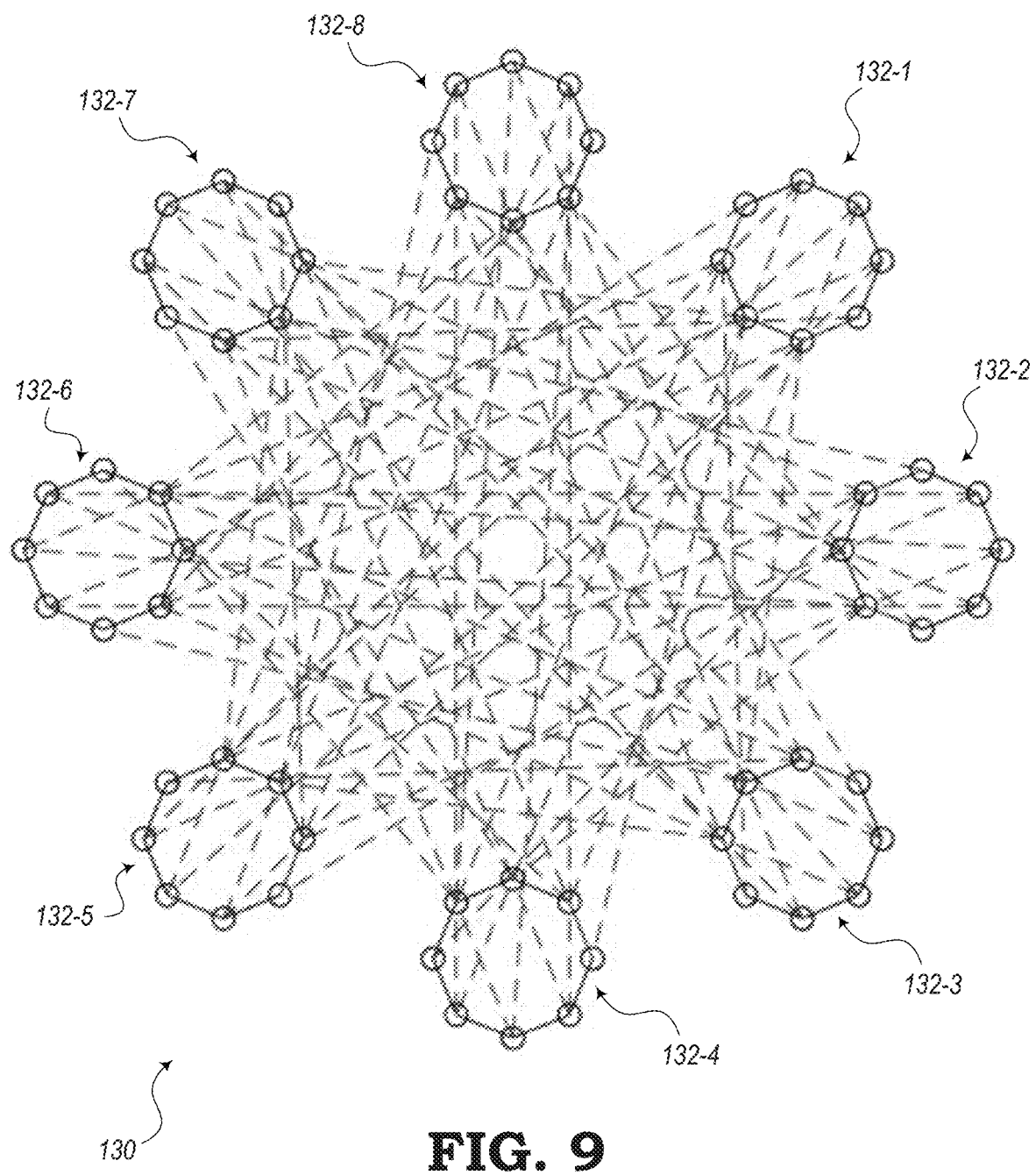
FIG. 9 is a diagram illustrating a network topology plan with inter-cluster links between clusters having a ring topology, according to various embodiments.

FIG. 9 is a diagram illustrating an example of a network topology plan 130, which is also configured with a compound network architecture (e.g., a plan that has a cluster of nodes). The network topology plan 130 includes eight clusters 132-1, 132-2, 132-3, 132-4, 132-5, 132-6, 132-7, 132-8, where each cluster 132 includes eight nodes. However, in this embodiment, the network topology plan 130 starts with each cluster 312 having pre-established intra-cluster connections already in place. Specifically, the pre-established intra-cluster connections in this example for each cluster 132 is a ring topology. From this initial starting point, the network topology plan 130 of FIG. 9 can be filled in be adding inter-cluster links between the clusters 132.

Thus, in this example, each cluster 132 is pre-built. If deemed necessary, the structure of the pre-built clusters 132 can be preserved by using only inter-cluster connections to complete the network. This may be achieved by choosing a node (having a node number B) to be outside of the first cluster, which is enforced by the restriction that B>R, where R is the size of (i.e., number of nodes in) each cluster. As shown in FIG. 9, the network topology plan 130 include 64 nodes, each having four degrees. The diameter k is four after the nodes are connected in eight clusters of eight-node rings. The intra-cluster connections are shown in blue and the inter-cluster connections are shown in red with dashed lines. The network topology plan 130 may be referred to as a compound network consisting of several interconnected identical cluster networks.

Adding Many More Links at a Time

Figure 10:
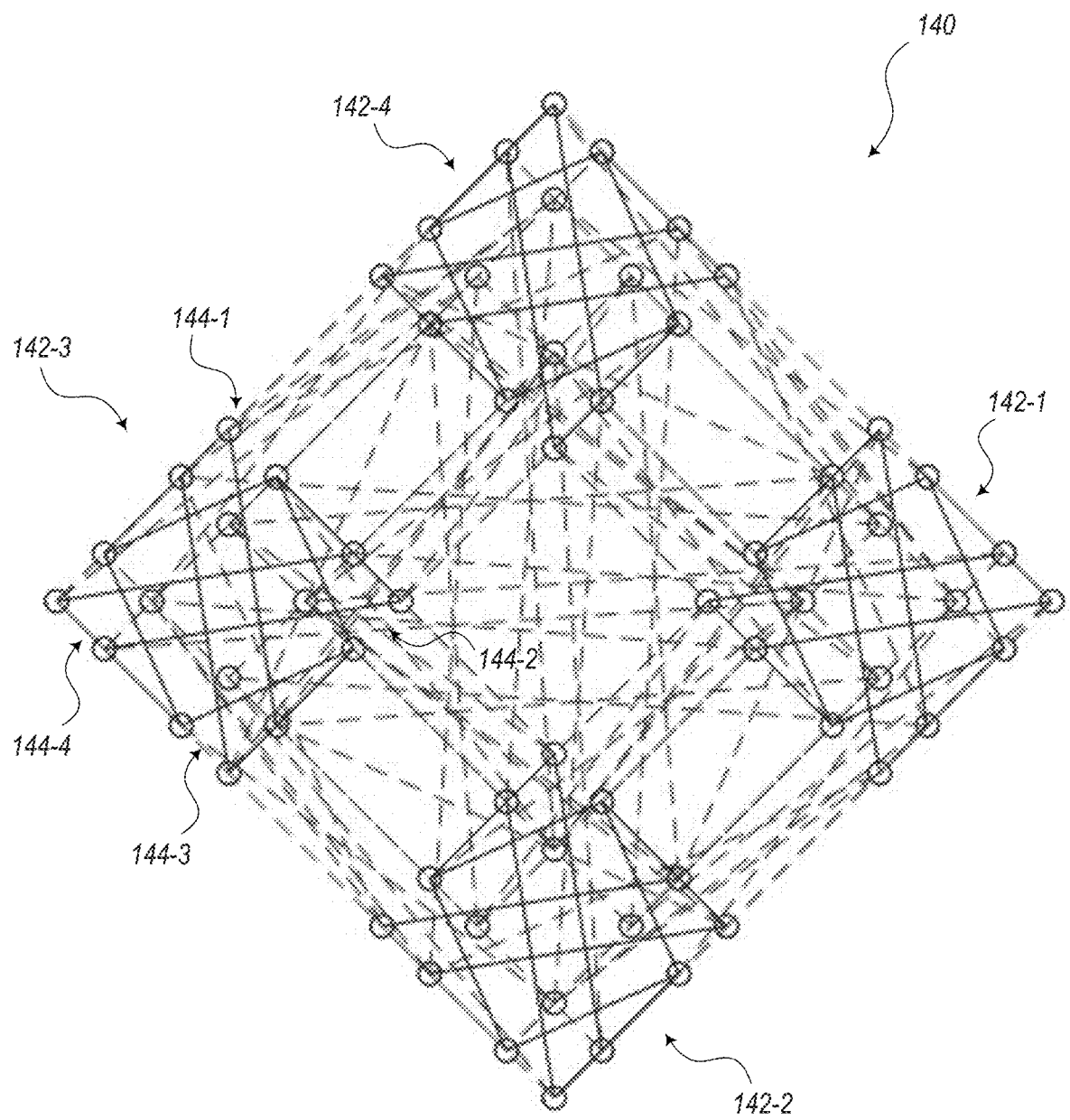
FIG. 10 is a diagram illustrating a network topology plan with nodes formed in clusters and sub-clusters with intra-cluster links and inter-cluster links, according to various embodiments.

FIG. 10 is a diagram illustrating an example of a network topology plan 140 with nodes formed in four clusters 142-1, 142-2, 142-3, 142-4, where each cluster 142 includes four sub-clusters 144-1, 144-2, 144-3, 144-4. (Only the sub-clusters 144 in cluster 142-3 are labelled in FIG. 10.) The network topology plan 140 includes intra-cluster links within each of the respective clusters 142 as well as inter-cluster links between the clusters 142. Again, the network topology plan 140 of FIG. 10 is a "compound" network. However, in this respect, not only does the network topology plan 140 include a first order of symmetry with respect to clusters 142 (similar to the embodiments of FIGS. 7-9), but also the network topology plan 140 includes a second order of symmetry with respect to sub-clusters 144 within each cluster 142. It may be noted that in even larger compound networks, there may be even more levels of clustering within the sub-clusters, sub-sub-clusters, etc.

In FIG. 10, the network topology plan 140 includes four clusters 142 with four completely disjoined sub-clusters 144 each. Intra-cluster links are shown as blue lines and inter-cluster links are shown as dashed red lines. In this implementation, the network topology plan 140 can be created more quickly. Thus, the network topology planning unit 44 is configured to further increase the speed of network building based on the inherent symmetry of the node arrangement. The network build may include simply applying an algorithm or technique that includes adding S links at a time, where S is the number of sub-clusters. It may be assumed that the number of nodes n is divisible by CS, where is C is the number of clusters 142 and S is the number of sub-clusters 144 in each cluster 142. It may be noted that each sub-cluster has the same number of nodes R.

The technique of "adding CS links at a time" may be defined as follows:

After finding two connectable nodes (i.e., node number A and node number B, where in this case for the sake of modal operations nodes are numbered 0 through n−1) and following the "adding one link at a time" technique, where:

For Subclusters 1 through S
  For Clusters 1 through C
    Nodes number A and number B are connected
    A=A+n/C, mod n; B=B+n/C, mod n;
  End for 1 through C
  $c_A$=floor(AC/n); A=(A−$c_A$n/C+n/C/S, mod n/C)+$c_A$n/C;
  $c_B$=floor(BC/n); B=(B−$c_B$n/C+n/C/S, mod n/C)+$c_B$n/C;
End for 1 through S Without any loss of generality for starters, node A can be chosen from within the first sub-cluster 144-1 of the first cluster 142-1, which is enforced by restriction A≤R=n/CS, where R is the size of a sub-cluster in this example. It may be noted that R is also the size of the cluster in the earlier examples.

The workings of this algorithm allow to accelerate the build of the network CS times faster than one link at a time and produces the symmetrical compound network (e.g., network topology plan 140) with C-fold rotational symmetry. The network topology plan 140 includes C identical symmetrical clusters 142 with S-fold rotational symmetry. The clusters 142 in turn include S identical sub-clusters 144.

The 64 four-degree nodes are arranged with a diameter k of 4, where C=4 and each cluster includes 16 nodes. Each cluster 142 includes four sub-clusters (S=4), where each sub-cluster 144 includes four nodes each. The technique for creating the topology includes starting with all nodes completely disjoint and using only inter-sub cluster connections, which is enforced by restriction B>R=n/CS. Again, intra-cluster connections are blue and inter-cluster connections are dashed red.

Figure 11:
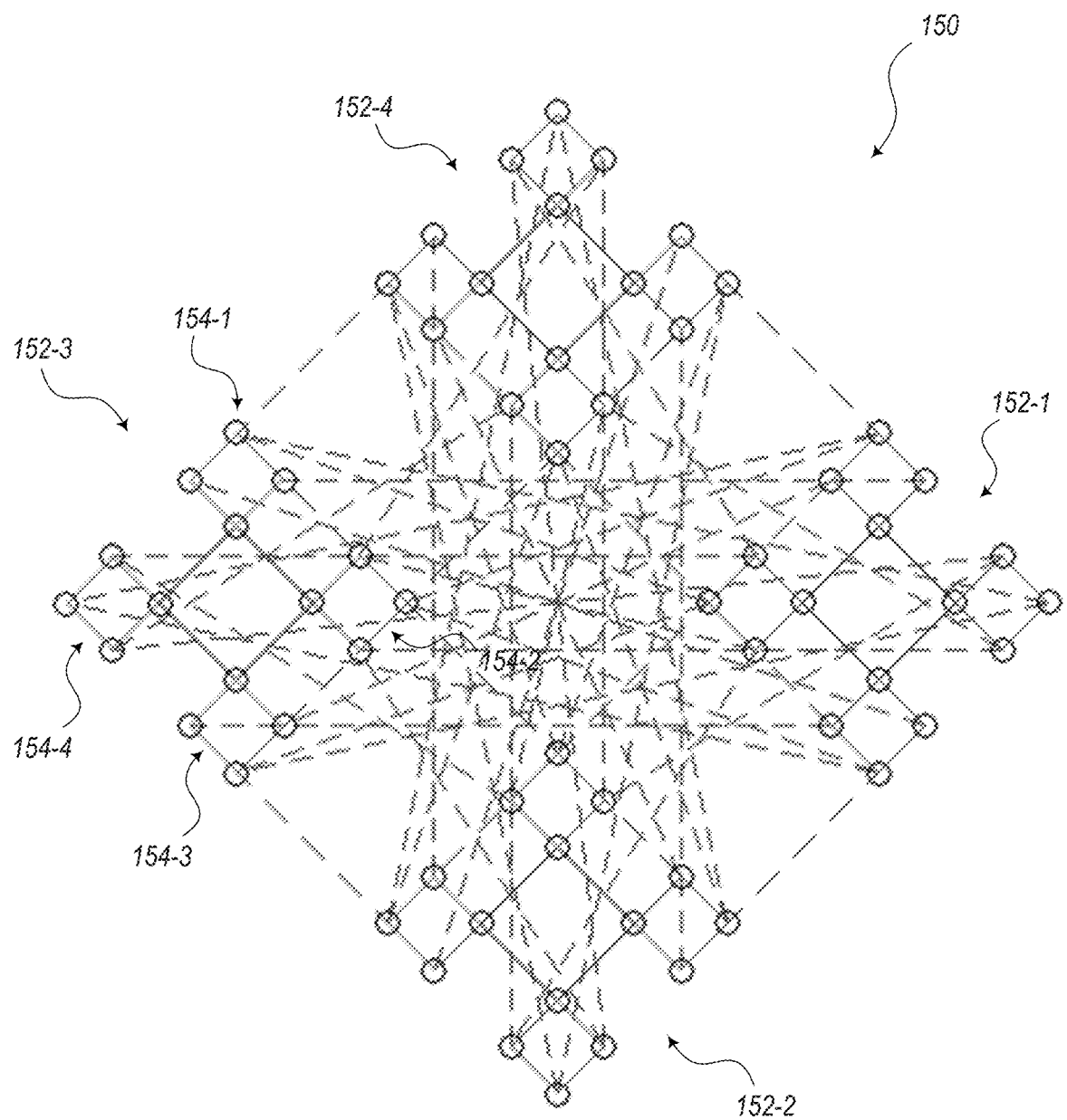
FIG. 11 is a diagram illustrating a network topology plan with nodes formed in clusters and sub-clusters with intra-sub-cluster links, inter-sub-cluster links, and inter-cluster links, according to various embodiments.

FIG. 11 is a diagram illustrating an example of a network topology plan 150 with nodes formed in clusters 152-1, 152-2, 152-3, 152-4 and sub-clusters 154-1, 154-2, 154-3, 154-4. (Only the sub-clusters 154 in cluster 152-3 are labelled in FIG. 11.) The network topology plan 150 includes intra-sub-cluster links, inter-sub-cluster links, and inter-cluster links. For example, the intra-sub-cluster links are shown with green lines, the inter-sub-cluster links are shown with blue lines, and the inter-cluster links are shown with dashed red lines.

The network topology plan 150 is another compound network and has a diameter k of four. It is a 64-node network with four clusters 152 with 16 nodes. These 16 nodes are formed in four sub-clusters of four nodes each. However, in the strategy related to FIG. 11, the clusters 152 and sub-cluster 154 initially begin with pre-determined intra-sub-cluster links. For example, the network topology plan 150 starts with pre-built four-ring sub-clusters using only intra-sub-cluster connections (i.e., shown in green). From this point, the network topology planning unit 44 is configured to fill in the rest of the network topology plan 150 using the intra-cluster (i.e., shown in blue) and inter-cluster connections (i.e., shown in red) to create the four-diameter system.

Therefore, it is possible to extend the "adding more links at a time" procedure farther by subsequently nesting more of sub-sub-clusters within the sub-clusters 154 and nesting sub-sub-sub-clusters within these sub-sub-clusters, and so on, whereby each level is configured to include rotational symmetry.

Just like "adding more links at a time" and "adding C links at a time," the technique described with respect to FIG. 11 of "adding many more links at a time" to create compound network builds can also utilize "hill climbing algorithms, the class of greedy local search, which might produce an optimal solution. However, they may be prone to getting stuck with local optimums instead of reaching a global optimum. To possibly obtain the optimal solution, the above-described network builds might need to be repeated a number of times, even many more times to achieve the optimal solutions like the ones shown in FIGS. 7-11.

Optimization of Non-Compound Networks by Rewiring

Figure 12:
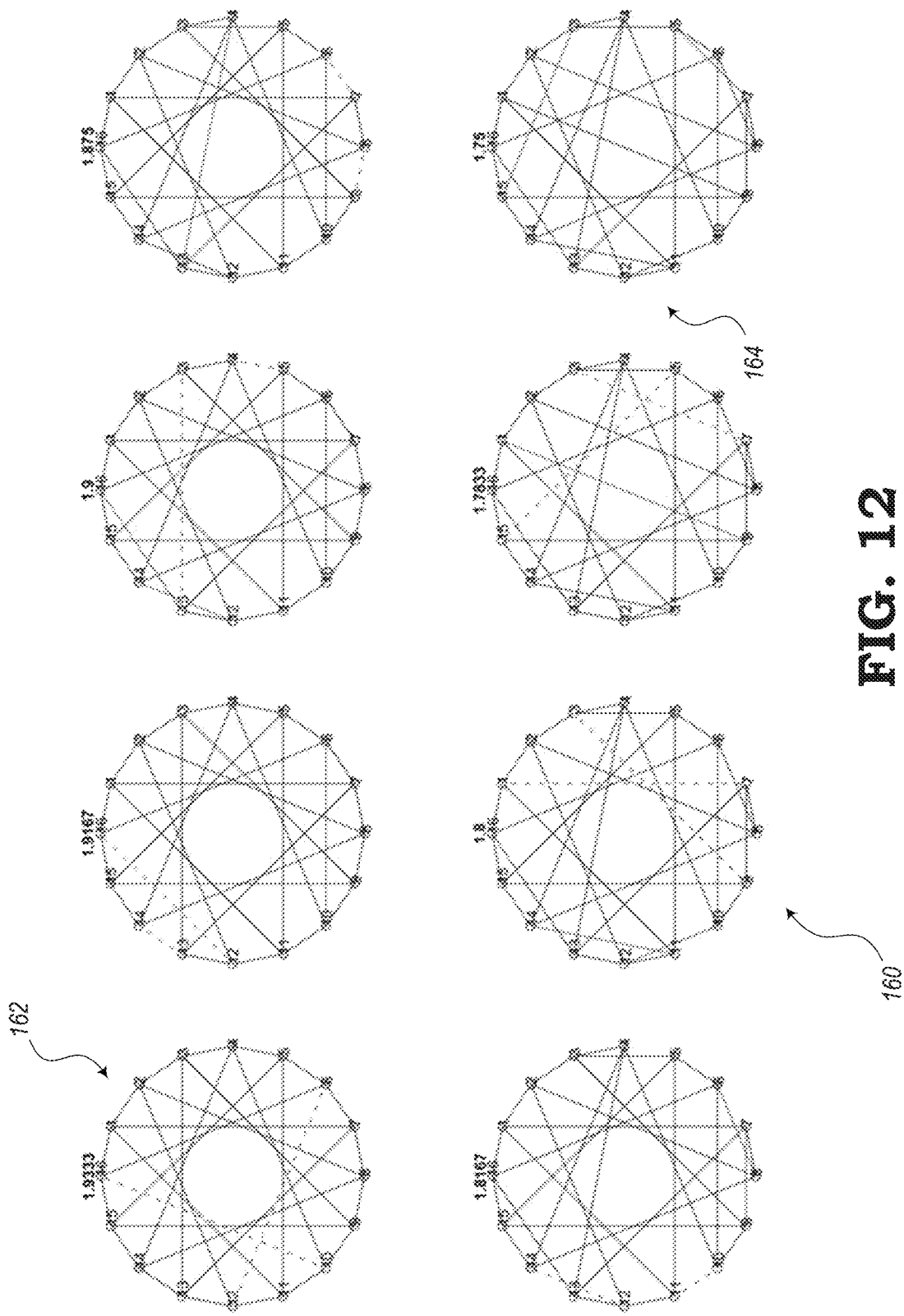
FIG. 12 is a diagram illustrating the progression of creating a network topology plan starting from an undirected topological graph and using a "2-cut" cutting and re-wiring procedure, according to various embodiments.
Figure 13:
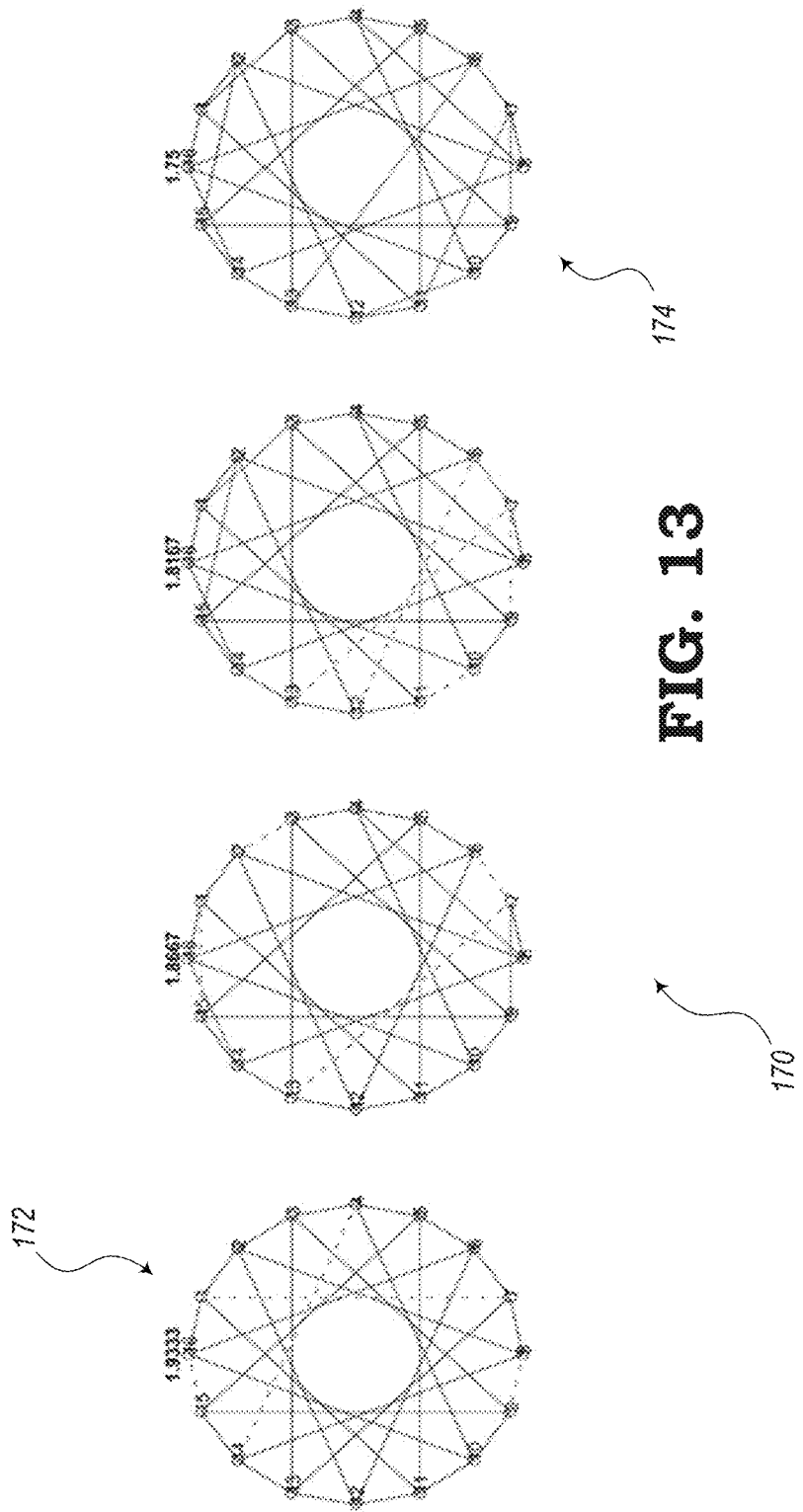
FIG. 13 is a diagram illustrating the progression of creating a network topology plan starting from an undirected topological graph using a "4-cut" cutting and re-wiring procedure, according to various embodiments.

With respect to FIGS. 12 and 13, additional techniques are described. In these implementations, however, the networks do not include a compound symmetry that allows dividing into clusters, sub-clusters, etc. These techniques use a subtraction and replacement strategy where a full topology is altered in multiple steps to refine the topology. If the strategy results in better quality (e.g., greater efficiency, greater speed, fewer average hops, less cost, etc.), then the revised stage is kept and more stages are attempted. In particular, each stage includes cutting two or more existing links and then replacing one or more links at the empty ports. It may be noted that the term "cutting" in this sense does not usually mean a physical cutting action, but instead refers to removing a virtual link during the planning of the topology. Then, with virtual ports or degrees to be filled, one or more links can be virtually added in the design.

FIG. 12 is a diagram illustrating an embodiment of a progression 160 for creating a network topology plan starting from an undirected topological graph 162 and using a "2-cut" cutting and re-wiring procedure. As shown, the 2-cut technique starts with a 16 node ring topology (e.g., circulant graph), where each of the 16 nodes includes four degrees (i.e., d=4) and the system is configured to start with a maximum distance (diameter) of four (i.e., k=4). Thus, in the n(d,k) format, the plan starts at 16(4,4) at the upper left hand corner of FIG. 12. The 2-cut process is used to optimize from the starting 16(4,4) network or circulant graph, which may be written using the notation Cr16(1,6), whereby the number 16 represents the number of nodes, the number 1 represents the circular distance (i.e., one node away or the adjacent nodes) to which each node is connected, and the number 6 represent the circular distance (i.e., six nodes away) to which each node is connected. Therefore, the circulant graph includes a repeatable pattern that has n-fold rotational symmetry, whereby each node is connected to its two nearest neighbors as well as the two nodes that are six nodes away in either direction around the circle.

In the initial plan 162 (i.e., shown in the upper left corner), the network topology plan has an average distance of 1.9333. That is, the average distance from one node to all the other nodes averages 1.9333 hops. After the 2-cut technique, the network topology plan can be improved to an optimized plan 164 (i.e., shown in the lower right plot), which provides an average distance of 1.75. Thus, the optimized plan 164 enables a more efficient transport from any node to any other node. Also, the maximum distance is improved in the optimized plan from 4 down to 3, meaning that the longest distance between nodes is three hops, down from the original four hops. The optimized plot of FIG. 12 can therefore be configured as a benchmark 16(4,3) optimal plot with an average distance of 1.75.

Optimization of non-compound networks (i.e., single cluster networks), like the ones obtained by adding one link at a time, can be performed using a simple Genetic Algorithm (GA), where mutations represent (virtually) cutting and rewiring of several links. By cutting 2, 3, and 4 distinct links, it is possible to produce 2, 14, and 104 mutations, respectively. In case of cutting two links (e.g., as shown in FIG. 12), mutations may be "bar" and/or "cross" re-wirings. For the case of cutting three links at a time (i.e., "3-cut"), 6 out of 14 mutations are of the "2-cut" variety, and one or the three cut links is preserved. The remaining 8 out of the 14 are mutations with all 3 links re-wired differently. In the case of the "4-cut" techniques, 12 are of the "2-cut" variety, 32 are with one of the links being preserved, and 60 are with all 4 links re-wired differently.

To optimize the Cr16(1,6) circulant graph, the "2-cut" and re-wiring technique of FIG. 12 includes starting with the symmetrical network. The links marked for cutting are shown in dashed lines. The re-wired links are shown in red. It may be noted sometimes newly re-wired links are immediately discarded, particularly if they do not provide any improvement in efficiency or cost. In this example, it takes a minimum of seven improvements for the starting network to get optimized. Each subplot in FIG. 12 is labelled with the average distance for the resulting network, which gradually decreases from 1.9333 to 1.75.

FIG. 13 is a diagram illustrating an example of a progression 170 for creating a network topology plan starting from an undirected topological graph 172 and using a "4-cut" cutting and re-wiring procedure. By allowing four cuts to be made at a time, the 4-cut technique can still explore all the reasonable possibilities for 3 and 4 links being cut by broadening the search for the optimal solution 174, all but for expense of increased volume of computations.

The optimization of the Cr16(1,6) circulant graph shown in FIG. 13 by the "4-cut" and re-wiring technique can provide advantages over the 2-cut technique. In particular, the "4-cut" technique can optimize more quickly. Instead of seven attempts, the 4-cut technique may take as few as three stages to optimize from the same starting network 172 to an optimized network 174 having the same improved average distance of 1.75.

Optimization of Compound Networks by Rewiring

Thus, FIGS. 12 and 13 show the cutting and re-wiring algorithms for a one-level non-compound network (i.e., a network without clusters). Also, optimization by using the cutting and re-wiring can also be performed on compound networks as well for optimizing even larger networks. For example, the clustering processes described with respect to FIGS. 7-11 can be combined with the cutting and re-wiring processes described with respect to FIGS. 12 and 13. In this way, a cutting and re-wiring algorithm can be used for one cluster, sub-cluster, sub-sub-cluster, etc.) and then repeated symmetrically for all the other clusters, sub-clusters, sub-sub-clusters, etc. Thus, the algorithms can be repeated for symmetrical compound networks obtained by "adding more links at a time" and "adding many more links at a time," which can be performed similarly to optimization of non-compound networks as above, with all the consequences and advantages of their symmetry. The great advantage of symmetrical compound network is in the fact that for every pair of cut and re-connected links there are C−1 more replicated by symmetry, thus accelerating the optimization process accordingly.

The symmetry of the compound networks also gives rise to a new possibility of specific optimization techniques resulting from their symmetry. This symmetry specific technique, which may be referred to as a "1-cut" technique, may require only one link to be cut. Symmetry of the network can then call for total of C links to be disconnected. This results in 2C−1 re-connected configuration possibilities. The respective node may be reconnectable with any of C−1 replicas of itself and C replicas of its original cut away neighbor, 2C−2 of them being mutations. The links to be cut to begin with may be limited to the ones originated from a single cluster, due to symmetry, thus reducing the pool of links potentially to be cut to a fraction of the total number of links, thus allowing to possibly work through all of them in the process.

Figure 14A:
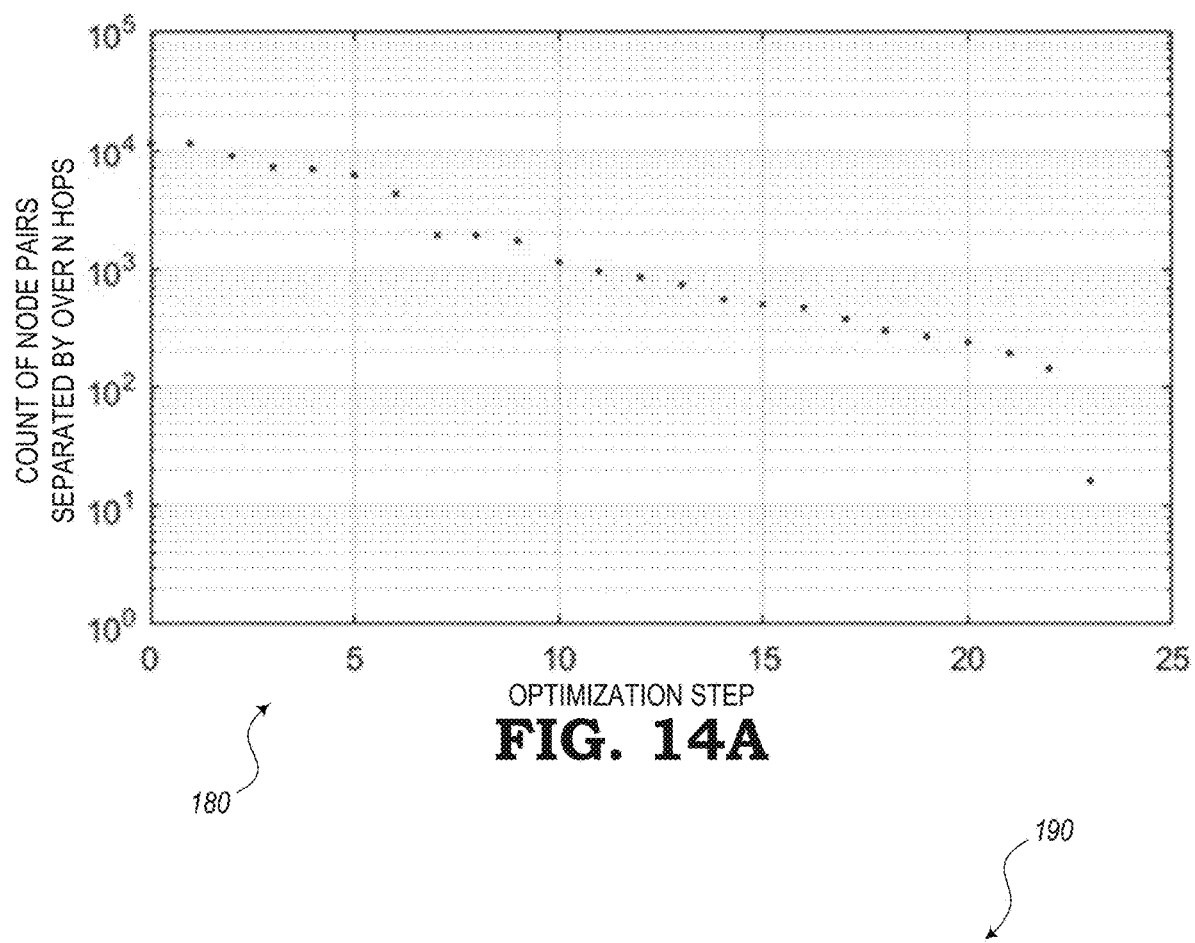
FIGS. 14A and 14B are charts illustrating the results of optimization processes for creating network topology plans by using a "1-cut" cutting and re-wiring procedure and comparing the arrangement of nodes within different cluster sizes, according to various embodiments.
Figure 14B:
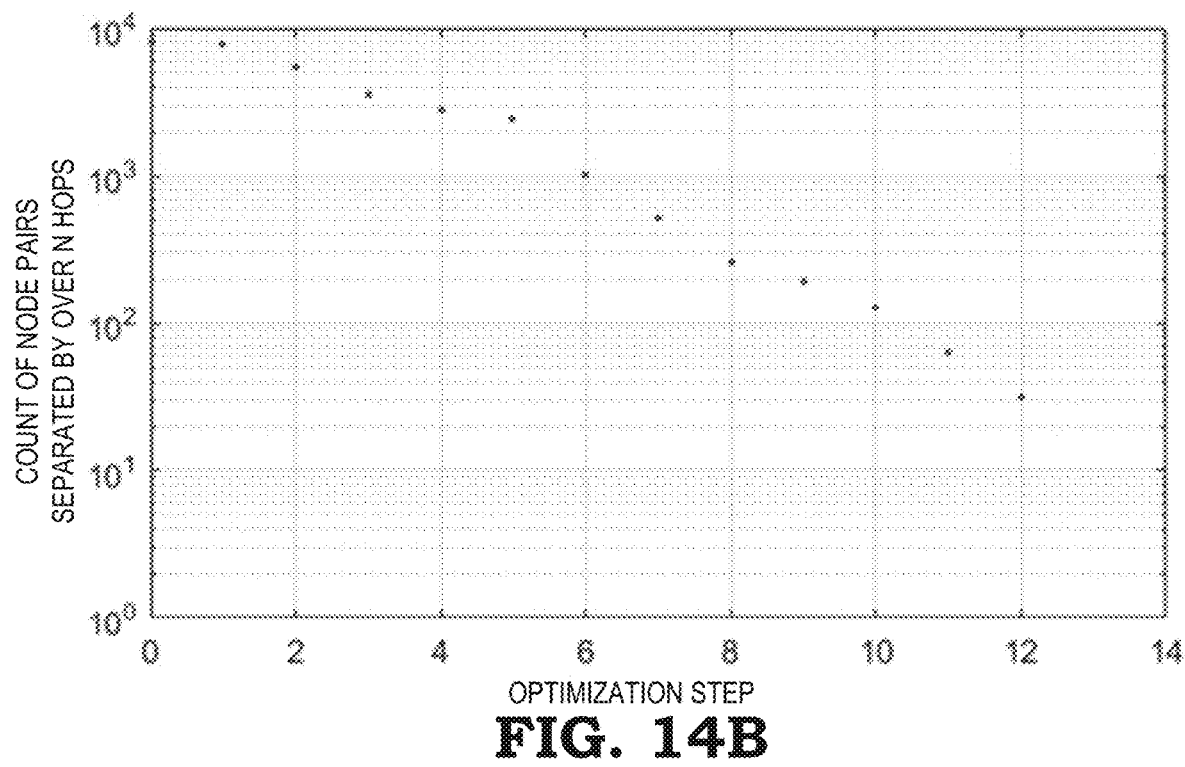

FIGS. 14A and 14B show examples of charts 180, 190 illustrating the results of optimization processes for creating network topology plans by using a "1-cut" cutting and re-wiring procedure and comparing the arrangement of nodes within different cluster sizes. To illustrate the new symmetry-specific technique, a diameter five (k=5) network known as a 256-node 6-degree circulant graph, which has an arrangement described by Cr256(1,49,90), was optimized using the processes described in the present disclosure to become a diameter four (k=4) network.

Again, the graphs show the use of the optimization processes by "1-cut" and re-wiring of a Cr256(1,49,90) circulant graph in to 256(6,4) compound graph. FIG. 14A shows the results whereby the network was divided into 32 clusters. FIG. 14B shows the results whereby the network was divided into 64 clusters. It can be seen that the process of dividing into more clusters resulted in arriving at an optimum more quickly.

In FIG. 14A, the chart 180 shows Figure of Merit (FM) along the y-axis, which in this case is the number of pairs of nodes at a distance of 5. The FM is monitored while optimizing step by step. With C=32, the optimization results in a network that can be optimized in 24 steps. That is, the pairs of nodes at a distance of 5 can be reduced down to zero in 24 steps, whereby the network then becomes a diameter 4 (k=4) system. In FIG. 14B, the chart 190 shows the FM of pairs of nodes at distance 5. With C=64, the optimization results in a network that can be optimized in 13 steps. That is, the pairs of nodes at a distance of 5 can be reduced down to zero in 13 steps.

The optimization of networks by rewiring described with respect to some embodiments of the present disclosure can be referred to as hill climbing algorithms, which again might produce an optimal solution, but may be prone to getting stuck with a local optimum instead of reaching a global optimum. To obtain an improved solution ("optimal solution"), the network planning techniques can be repeated one or more times. In some cases, even more repetitions may be able to achieve a much improved network topology (e.g., "the optimal solution"), such as the ones shown in the previous figures. In some respects, the repetitions may be considered to use a "shotgun hill climbing" technique.

Global Optimization of Existing Networks

Global optimization of existing network is aiming at reaching the global optimum and is performed using Genetic Algorithms (GA) with either Simulated Annealing (SA) or tabu searching. Mutations in GA are alternative re-connections of arbitrarily disconnected links, like in the described above "1-cut," "2-cut," and "4-cut" techniques. Figure of Merit (FM) is a mean distance in the network or number of pair of nodes distanced farther than the target diameter. SA is implemented by using Boltzmann-like exponential probability of selecting mutations with non-minimal FM, with an Energy being the excess of non-minimal FM with respect to minimal FM and kT scaling the excess. Tabu search in turn backs up out of the detected, possibly local, optimums and memorizes and prohibits re-entering already explored avenues, which may lead to failed outcomes. Being more "conscious" and "intelligent" than stochastic SA, tabu search is usually more successful in finding optimal or near optimal solutions and in a shorter time than SA, and therefore may be preferred in some embodiments for global optimization heuristics.

To illustrate this global technique based on GA with tabu search, the diameter 3 network known as 32-node 6-degree circulant graph (e.g., arranged as Cr32(1,6,9)) was optimized to become a diameter 2 network, featured as a record 32(6,2) graph in the table of the orders of the largest known graphs for the undirected degree/diameter problem at Combinatorics Wiki.

Figure 15A:
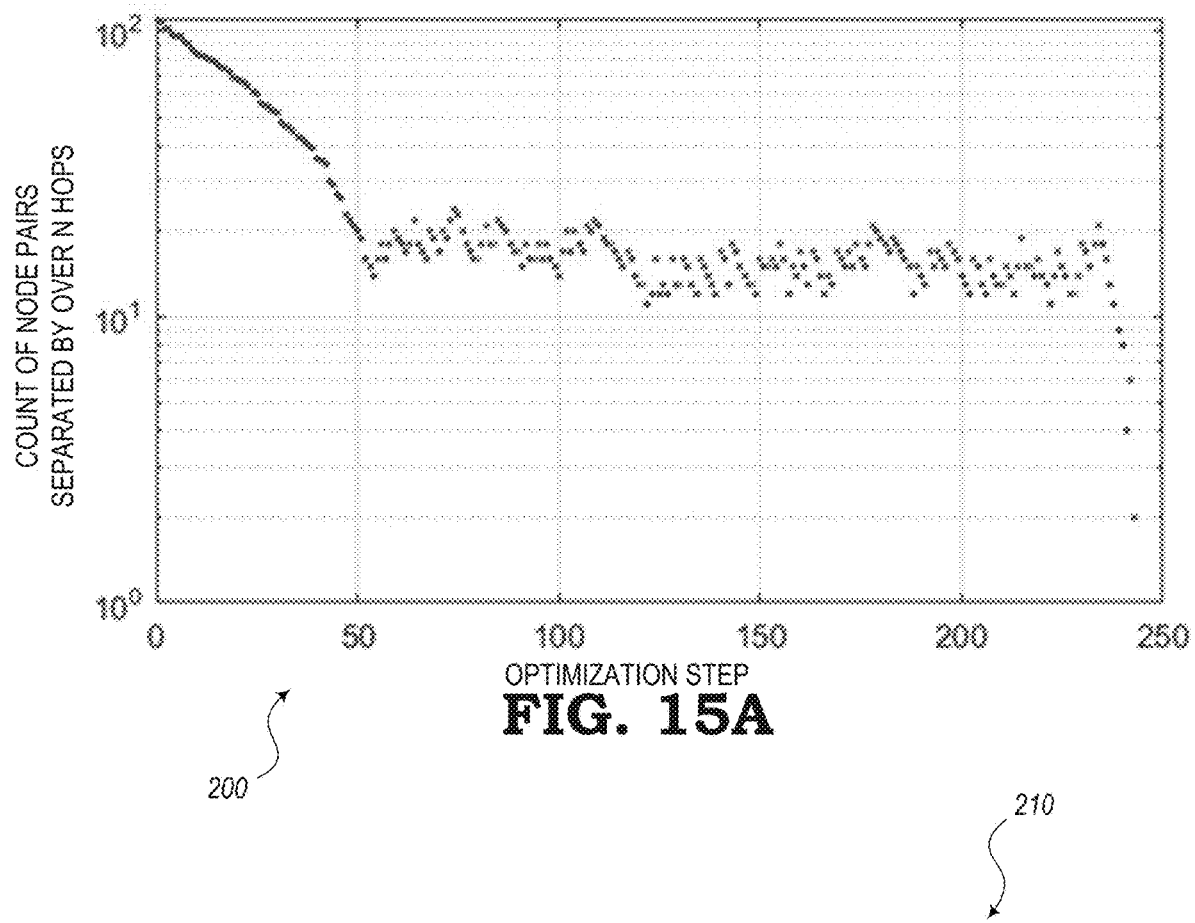
FIGS. 15A and 15B are charts illustrating the results of optimization processes for creating network topology plans and comparing the "2-cut" cutting and re-wiring procedure with the "4-cut" cutting and re-wiring procedure, according to various embodiments.
Figure 15B:
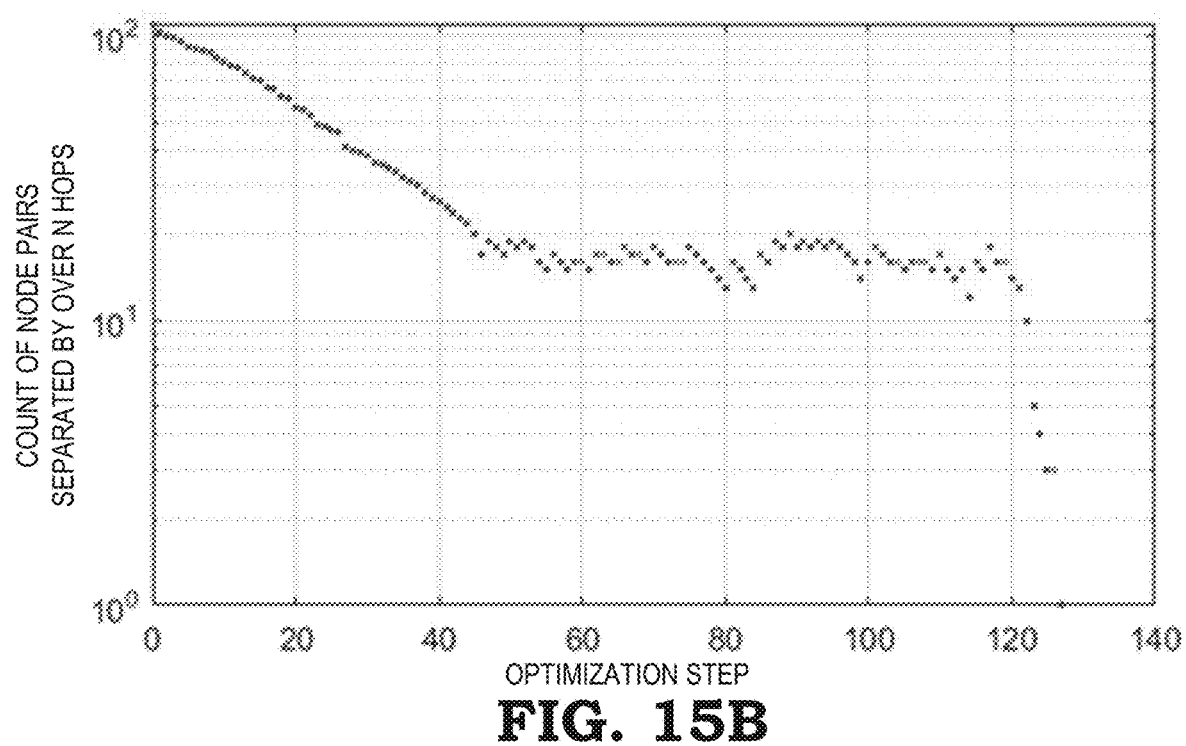

FIGS. 15A and 15B are charts 200, 210 illustrating the results of optimization processes for creating network topology plans and comparing the "2-cut" cutting and re-wiring procedure with the "4-cut" cutting and re-wiring procedure. In FIG. 15A, the chart 200 shows the results of global optimization of the Cr32(1,6,9) circulant graph to a 32(6,2) graph of 32 clusters using the "2-cut" re-wiring process. In FIG. 15B, the chart 210 shows the results of the global optimization of the Cr32(1,6,9) circulant graph to a 32(6,2) graph of 32 clusters using the "4-cut" re-wiring process.

In the charts 200, 210, the Figure of Merit (FM), which in this case is the number of pairs of nodes at distance 3, is monitored while optimizing step by step. Blue dots represent a decreasing (improving) FM, red dots show backing out (diminishing) of the local optimum, and green dots correspond to the search being plateaued (neither improving nor diminishing). As can be seen in the chart 200 of FIG. 15A, the network uses "2-cut", search hit and avoided the first local optimum on steps 53 and 54, correspondingly, resulting in network being optimized in 244 steps. As can be seen in the chart 210 of FIG. 15B, the network uses "4-cut," which results in the optimization of the network in just 128 steps, hitting and avoiding the first local optimum on step 46 and 47, correspondingly.

New Global Network Optimization Technique Based on Extra Link

New and more efficient global optimization techniques may be based on linking to non-adjacent nodes with an extra link. This can be referred to as a "1-link" technique, where an extra link is added (virtually), which may thereby exceed the number of available degrees. As such, the technique thereby includes another step of "cutting" (virtually) to bring the number of degrees to the proper number. This increases the degree these formerly non-adjacent nodes into nodes with an extra degree, i.e., their degree exceeds the regularity of a graph by one. To return them to regularity, (i.e., having the same degree as the rest of the nodes in a regular graph), one of their pre-existing links to corresponding adjacent neighboring nodes must be cut. After that, the newly available degrees are ready for re-connection links ("dangling" from the nodes) with an extra link and their disconnected neighboring nodes may also be re-connected. This comprises the mutation in GA.

The total amount of possible mutations may easily become essentially enumerable with respect to large networks since it is equal to number of pairs of non-adjacent nodes times degree squared, or $(n(n-d-1)/2) \times (d^2)$. It may be possible to apply all possible mutations only for optimization of fairly small networks, where their number is still moderately manageable. However, for the larger networks, some acceptably smaller partial subset of total mutations can be selected randomly. These mutations may be utilized in the process of global optimization of networks in the same manner as in "1-link," "2-cut," and "4-cut" techniques described above but may provide much richer diversification of re-connections and hence allow for a more efficient and faster optimization procedure. To illustrate this new "1-link" global optimization technique based on an extra link, the same diameter-3 network (e.g., 32-node 6-degree circulant graph), or Cr32(1,6,9), was similarly optimized to become a record diameter 2 network.

Figure 16A:
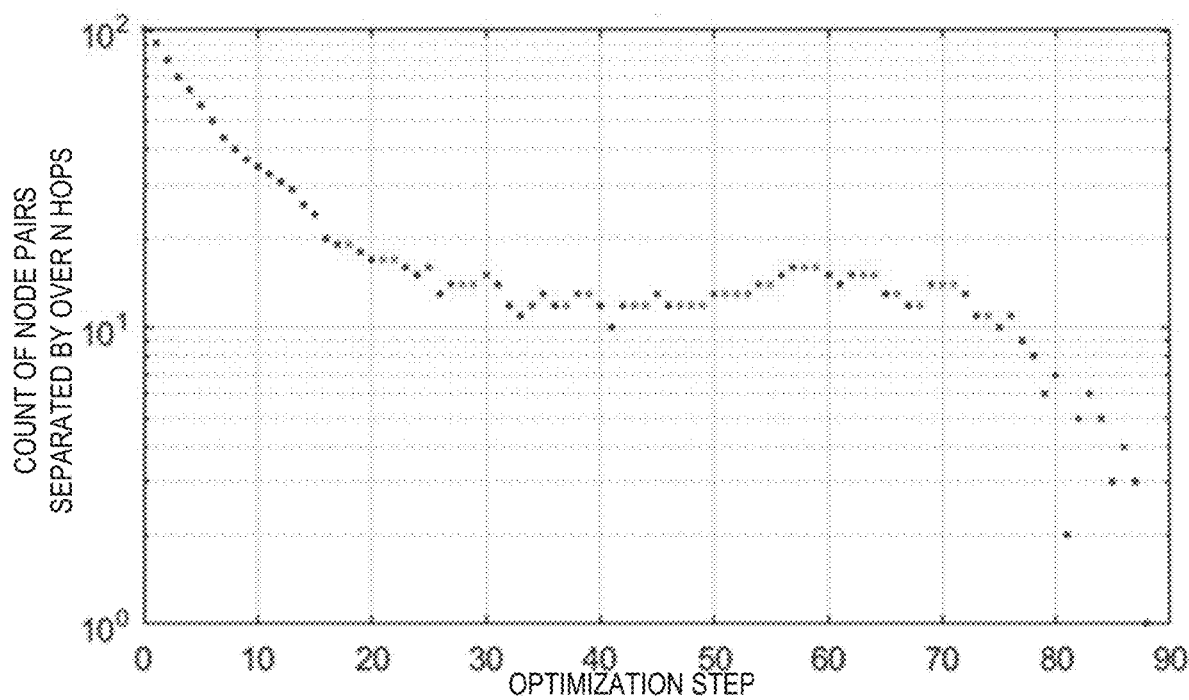
FIGS. 16A and 16B are charts illustrating the results of optimization processes for creating network topology plans by using a link-adding procedure and comparing a non-clustered node arrangement with a clustered node arrangement, according to various embodiments.
Figure 16B:
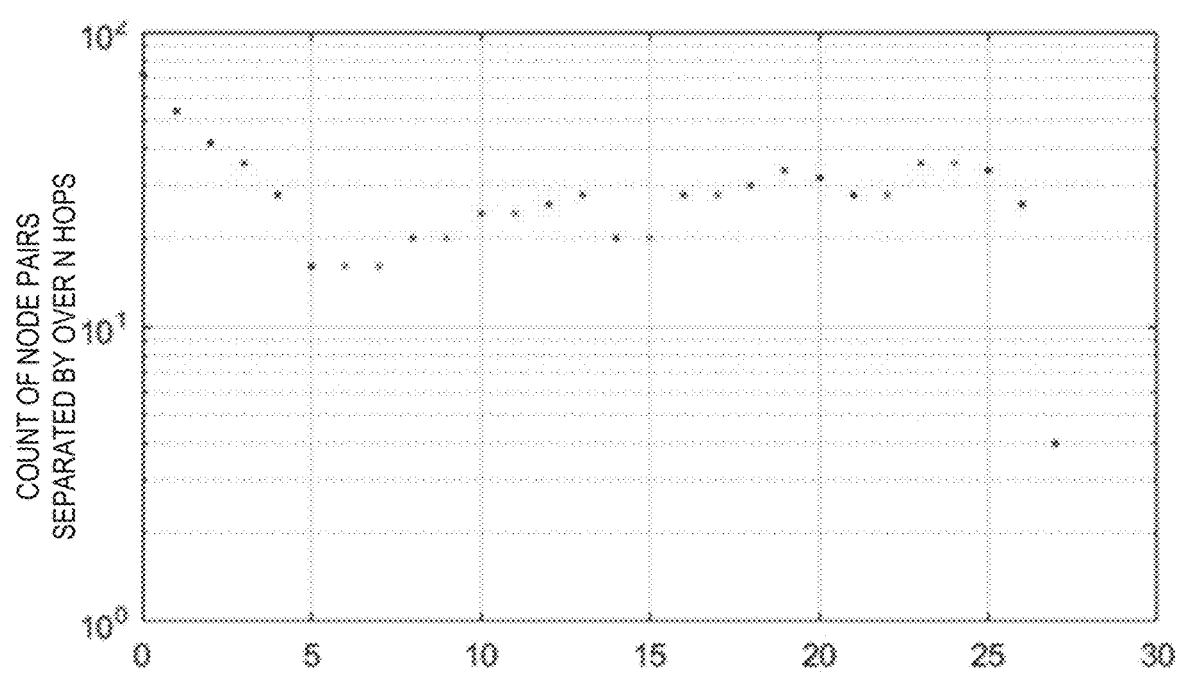

FIGS. 16A and 16B show charts 220, 230 that illustrate the results of optimization processes for creating network topology plans by using a link-adding procedure and comparing a non-clustered node arrangement with a clustered node arrangement, according to various embodiments. The chart 220 of FIG. 16A shows the global optimization by "1-link" of Cr32(1,6,9) circulant graph to 32(6,2) non-clustered network (C=1). The chart 230 of FIG. 16B shows the global optimization by "1-link" of the Cr32(1,6,9) circulant graph to a compound network of four clusters (C=4). Again, the clustering process shows quicker optimization.

In FIGS. 16A and 16B, the Figure of Merit (FM), which in this case is the number of pairs of nodes at distance 3, is monitored while optimizing step by step. Dots are similarly color-coded to represent decreasing FM (blue), backing out of local optimum (red), and plateauing (green). The chart 220 of FIG. 16A shows a case of "1-link" technique applied to optimize a non-clustered network (C=1), search hit and avoided the first local optimum on step 24 and 25 correspondingly, resulting in network being optimized in 89 steps. The chart 230 of FIG. 16B shows a case of "1-link" technique applied to optimize a clustered network (C=4), resulting in optimization of the network in just 28 steps, hitting and avoiding the first local optimum on step 5 and 8 correspondingly.

Algebraic Network Design Algorithms

Most prolific algorithms responsible for the majority of the entries to the Table of the Orders of the Largest Known Graphs for the Undirected Degree/Diameter Problem, described by Combinatorics Wiki and referenced above, are based on algebraic relations defining the conditions for node interconnections. These algorithms allow for the creation of the graphs almost at once and provide for fast and efficient optimization routines based on algebraic formula defining the graph topology.

The majority of the record graphs are authored by E. Loz ("New record graphs in the degree-diameter problem," Australasian Journal of Combinatorics 41 (2008), 63-80), which are compound graphs of C clusters and are based on a semidirect product of cyclic groups (i.e., Cayley graphs). In other words, this arrangement includes node a of cluster c connected to node $a'=aw^u+v$, mod R of cluster $c'=c+u$, mod C, where R=n/C and in this case nodes a and a' are numbered 0 through R−1 and clusters c and c' are numbered 0 through C−1 for the purpose of modal operations. The graph design and topology are defined by the base w and set of generators u and v. The base graph of these Cayley graphs, which is comprised of clusters as its nodes and manifolds of links between clusters as its links, is a symmetrical circulant graph (i.e., the Cayley graph itself).

Another contribution to the Table of the Orders of the Largest Known Graphs for the Undirected Degree/Diameter Problem is made by G. Exoo ("A family of graphs and the degree/diameter problem," J. Graph Theory 37 (2001), 118-124), which describes a system that traded graph symmetry and complex semidirect product for much simpler circulant rule for node interconnection, based on circular shift by the constant s. That is, node a is connected to node a'=a+s, mod R. The base graph of these compound graphs of C clusters is not necessarily symmetrical circulant Cayley graphs.

New Algebraic Network Design Algorithms Based on Chordal Rings

New algebraic network design algorithm may be based on the replacement of simple circulant interconnection rule and based on a circular shift (Exoo) with more diverse chordal rings (K. Doty, "New Designs for Dense Processor Interconnection Networks," IEEE Transactions on Computers, vol. C-33, No. 5, May 1984, p 447), which periodically repeats the patterns of circular shifts, introducing richer diversity of interconnections and providing better connectivity.

For an exemplary illustration of the comparative performance of the algebraic network design techniques of the present disclosure, the familiar 32(6,2) record graph with C=2 was re-created using the embodiments described herein. It is worth noting that none of the above-mentioned conventional algebraic network design algorithms were able to achieve this result, but instead ended short with a correspondingly 32 (Loz) and 16 (Exoo) pairs of nodes still at distance 3.

Figure 17A:
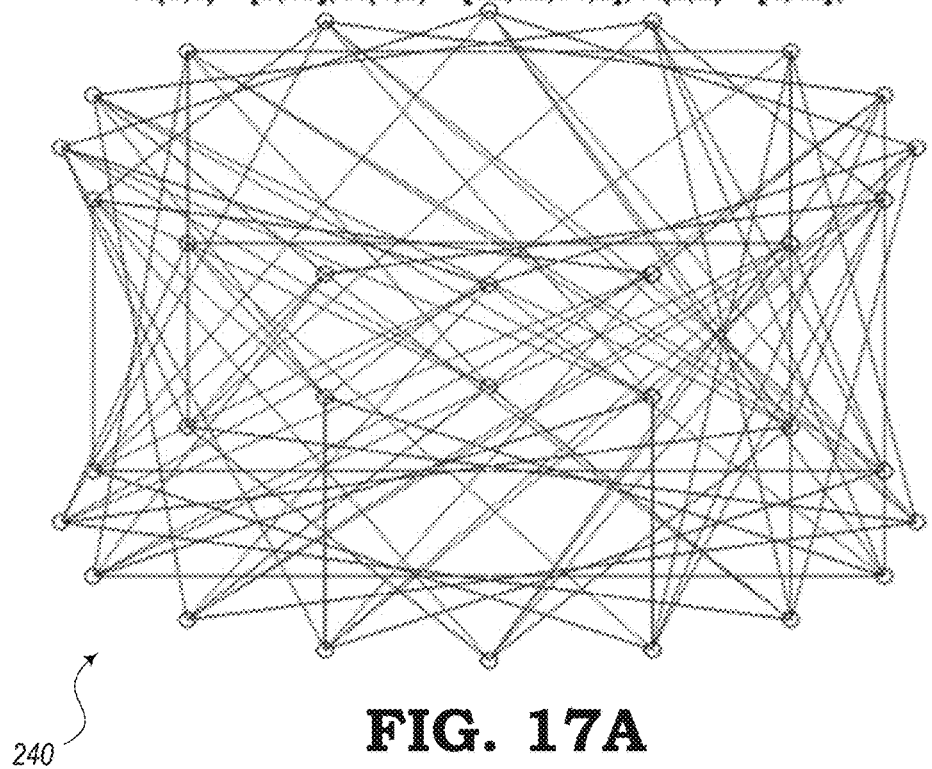
FIGS. 17A and 17B are diagrams illustrating network topology plans for comparing the results of a conventional plan and a plan based on the teachings of the present disclosure, according to various embodiments.
Figure 17B:
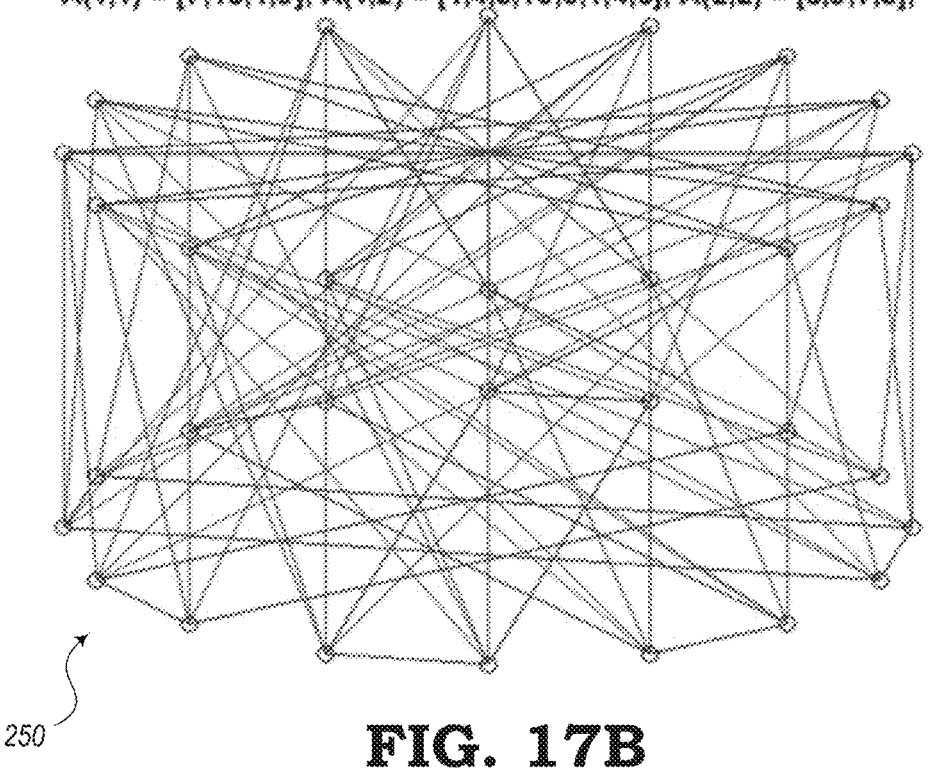

FIGS. 17A and 17B are diagrams illustrating network topology plans for comparing the results of a conventional plan and a plan based on the teachings of the present disclosure. In particular, FIG. 17A shows a network topology graph 240 resulting from conventional methodology and FIG. 17B shows a network topology graph 250 resulting from the embodiments of the present disclosure. It can be seen that the results of the systems and methods of the present disclosure outperform the conventional algorithms.

The network topology graph 250 is a two-cluster (C=2) re-created record graph, defined as 32(6,2), while the closest contender of the conventional systems (using the second algebraic network design algorithm and with C=2) has 16 pairs of nodes that still remain at distance 3. The network topology graph 240 resulting from conventional methods is a 32(6,3) algebraic graph with circulant interconnections following Exoo. The network topology graph 250 of the present disclosure is a 32(6,2) algebraic graph with chordal interconnections.

Both designs are comprised of 2 clusters (C=2) consisting of 16 nodes (black circles), nodes being arranged clockwise on a dial. Node interconnections are color-coded. The intra-cluster links are colored blue, while inter-cluster links are colored red. The red-colored inter-cluster links are directed from source node a at the bottom oval shaped source cluster toward target node a' in the top oval shaped target cluster.

Also, the labels above each graph shown in FIGS. 17A and 17B are algebraic generators defining the design topologies of the pictured graphs in the form A(S,T) listing the numerical values of circular shifts involved in link interconnections between source cluster S and target cluster T, with S being equal to T to produce the intra-cluster connections.

While new algebraic network design algorithms allow the network topology planning unit 44 to build the network topology almost at once, it still does not necessarily guarantee that the design may end up optimal just by the initial or repetitive choice of algebraic generators. Thus, to obtain an even better result (e.g., an optimal topology), follow-up optimization methods of the initially created topology may also be performed, as needed, which may be accomplished by applying custom optimization routines based on GA with tabu search, as described above.

Figure 18:
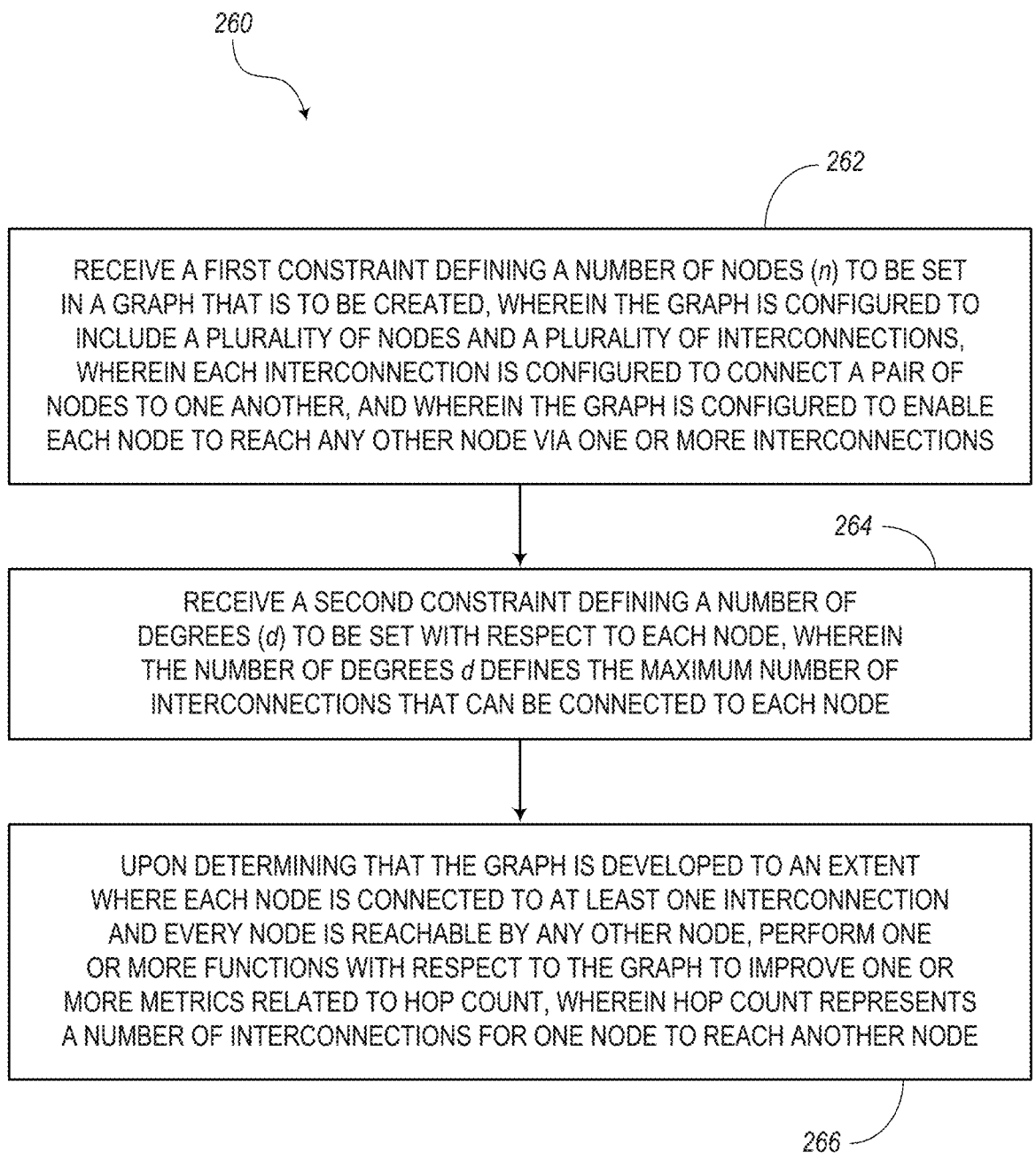
FIG. 18 is a flow diagram illustrating a process for creating a network topology plan within certain constraints, according to various embodiments of the present disclosure.

FIG. 18 is a flow diagram illustrating an embodiment of a process 260 for creating a network topology plan within certain constraints. As shown in the embodiment of FIG. 18, the process 260 includes the step of receiving a first constraint defining a number of nodes (n) to be set in a graph that is to be created, as indicated in block 262. The graph (under construction) is configured to include a plurality of nodes and a plurality of interconnections (when complete). Each interconnection is configured to connect a pair of nodes to one another. Also, the graph is configured to enable each node to "reach" any other node via one or more interconnections. Furthermore, the process 260 includes the step of receiving a second constraint defining a number of degrees (d) to be set with respect to each node, as indicated in block 264. The number of degrees d defines the maximum number of interconnections that can be connected to each node. Upon determining that the graph is developed to an extent where each node is connected to at least one interconnection and every node is reachable by any other node, the process 260 is configured to perform one or more functions with respect to the graph to improve one or more metrics related to hop count, as indicated in block 266. The hop count, for example, represents a number of interconnections needed for one node to reach another node. Additional constraints can include the requirements to have clusters/sub-clusters with preserved predetermined topology and/or allowing inter-cluster/inter-sub-cluster interconnections only.

The graph, according to various embodiments, is a network topology plan for defining a topology of a communication network. For example, the communication network is configured to include a plurality of network elements and a plurality of links, where the network elements may be represented by the nodes in the graph and the links may be represented by the interconnections in the graph. The one or more metrics related to hop count may include a first metric and/or a second metric. The first metric, for example, may be related to an average distance, in hops, between each pair of nodes in the graph. The second metric, for example, may be defined as a diameter k and may be related to a maximum distance, in hops, between any pair of nodes in the graph. The step of improving the one or more metrics (block 266) may include decreasing the first metric and/or decreasing the second metric.

The step of performing the one or more functions with respect to the graph (block 266) may include the steps of a) dividing the nodes into a number of identical clusters (C), and b) replicating actions applied to one cluster to the corresponding nodes, intra-cluster interconnections, and inter-cluster interconnections with respect to the other clusters. The step of dividing the nodes into the number of identical clusters further includes dividing the symmetrical clusters C into one or more levels of identical sub-clusters, sub-sub-clusters, sub-sub-sub-clusters, etc.

The process 260 of FIG. 18 may further be defined whereby the step of performing the one or more functions with respect to the graph (block 266) may also include creating a regular graph, where the regular graph may be defined by a situation where each node is connected to exactly d interconnections. In some embodiments, the step of performing the one or more functions with respect to the graph (block 266) may further include a) cutting a plurality of existing interconnections in the graph, thereby vacating degrees of multiple nodes, and b) re-wiring one or more mutated interconnections to the degrees vacated by cutting the existing interconnections. In some embodiments, the step of performing the one or more functions with respect to the graph (block 266) may further include a) dividing the nodes into a number of identical clusters (C) and b) replicating cutting and re-wiring applied to one cluster to the corresponding nodes and interconnections of the other clusters. The step of cutting the plurality of existing interconnections in the graphs may include randomly selecting the interconnections to cut.

In some embodiments, the step of performing the one or more functions with respect to the graph (block 266) may include adding one or more extra interconnections between one or more pairs of nodes, which would thereby create an excess of interconnections with respect to degrees of multiple nodes. Then, the process 260 may include removing one or more interconnections from nodes having excess interconnections, to return to the regular number of degrees d for each node.

As mentioned above, block 266 includes the action of determining that the graph is developed to an extent where each node is connected to at least one interconnection and every node is reachable by any other node. In some embodiments, this may include a) starting the graph with no interconnections, and b) adding one or more interconnections at a time until the graph is developed to the extent where each node is connected to at least one interconnection and every node is reachable by any other node. The step of determining that the graph is developed to an extent where each node is connected to at least one interconnection and every node is reachable by any other node may alternatively include starting the graph with a ring topology, a circulant architecture, or other suitable arrangement.

The one or more metrics described in block 266 may be related to latency, link bandwidth, traffic load, reliability, effectiveness, an ability to operate after a fault is detected, path recovery time, monetary cost, and/or any suitable weighted combination of these factors. In some embodiments, the process 260 may further include the step of performing a Genertic Algorithm (GA) with Simulated Annealing (SA) technique and/or a tabu searching technique to obtain a more globally efficient graph.

In conclusion, it should be emphasized that the embodiments described in the present disclosure are configured to provide improved techniques for obtaining better (e.g., optimized) network topologies. Again, the present disclosure includes several points of novelty with respect to conventional system for improving the creation of network topologies that are more efficient and cost less, among other benefits.

For example, one point of novelty is that the embodiments of the present disclosure are configured to provide accelerated design of symmetrical compound networks. The present implementations provide network design procedures that are significantly faster than the conventional "hill climbing" process of connecting pairs of nodes one pair at a time. By utilizing the inherent symmetry of compound network topology (i.e., including identical and identically connected clusters of nodes), the network topology planning unit 44 is configured to plan for only one cluster to be interconnected and then extrapolate or replicate similar interconnections to the rest of the clusters.

The network design process of the present disclosure can either start with completely disjoint set of nodes or with clusters having pre-determined and fixed topology. Along with essentially unrestricted choices of pairs of nodes to be connected, the only restrictions for interconnection planning by the network topology planning unit 44 are to connect nodes belonging to the same cluster (intra-cluster connections) or to connect nodes belonging to different clusters (inter-cluster connections). Either or both can be implemented to allow for extra flexibility in network design options.

In addition, the present disclosure provides points of novelty in that the clusters comprising the compound network can in turn contain similarly identical and identically connected sub-clusters of nodes, further accelerating the network design and increase the diversity of interconnections. The network design process can optionally start either with completely disjoint set of nodes or with sub-clusters having pre-determined and fixed topology. Along with unrestricted choice of pairs of nodes to be connected, restrictions to connect only nodes belonging to the same sub-cluster (intra-sub-cluster connections) or to different sub-clusters (inter-sub-cluster connections) can be implemented to allow for extra flexibility in network design options. Furthermore, it is possible for the network topology planning unit 44 to extend the procedures of nesting sub-cluster within clusters further by subsequently nesting more of sub-sub-clusters and sub-sub-sub-clusters within sub-clusters and sub-sub-clusters respectively and so on. The interconnection restrictions may therefore be applicable at all the levels of nesting.

Furthermore, the embodiments of the present disclosure are novel with respect to conventional systems in that the present disclosure provides new algebraic designs of compound networks. Algebraic network designs allow for the creation of the topology almost at once instead of connecting pairs of nodes one pair at a time. Also, they provide for fast and efficient generation and optimization routines based on algebraic formula defining the network topology.

The algebraic design of compound networks, as described in the present disclosure, are configured to improve the conventional algebraic designs that are based on circulant graphs utilizing the single cyclic shift to define the interconnections between nodes (i.e., both intra-cluster and inter-cluster interconnections). The novelty of the algebraic designs of the present disclosure are configured to utilize more diverse chordal rings and utilize periodic patterns of different cyclic shifts instead of a single one. This can provide for more diverse connectivity and more efficient network topology.

Also, the present disclosure is configured to provide optimization of existing networks by various rewiring techniques. Conventional genetic algorithm (GA) methods of optimization of network topology utilize greedy (locally optimized) cutting and re-wiring any two of existing links as mutations, so-called "2-cut" method, the systems and methods of the present disclosure includes procedures that involve cutting and re-wiring any four available links as mutations, which may be referred to as a "4-cut" method. Instead of just two alternative re-wiring options of "2-cut" (e.g., cross and bar), the "4-cut" process provides more than a hundred options, allowing for more diverse, efficient, and faster cutting and re-wiring optimization of network topologies.

Another aspect of the present disclosure that is considered to be novel is the optimization of compound networks by rewiring. This new optimization technique is specifically designated for compound networks and fully utilizes the intrinsic symmetry of the network topology. That is, any one link cut ("1-cut") can be instantly replicated by every cluster (and likewise for the re-wired links), thus accelerating the optimization process accordingly.

Furthermore, the present disclosure provides improvements over the conventional systems by the processes of global optimization of existing networks, as described herein. While "1-cut", "2-cut", and "4-cut" methods can produce more optimal solutions, some may be based on local searching and may be prone to getting stuck with local optimums instead of reaching a global one. Conventional GA utilize Simulated Annealing (SA) to avoid being stuck with the local optimum and escape from it. While this work in some cases, it usually takes quite a long time to reach a global or near global optimum due to the intrinsically stochastic (randomly determined) nature of SA.

However, the new global optimization GA of the present disclosure utilizes more "conscious" and intelligent methods to avoid being stuck with the local optimum and escape from it. Whenever the (local) optimum is reached, it is recorded and the search backs up out of it either by backtracking in its step or by finding and following the shallowest "mountain pass" out of the valley. The further search avoids getting into the recorded (local) optimums by excluding the mutations leading to them.

Also, the present disclosure provides new global optimization of existing networks based on an extra link process. The network topology planning unit 44 may be configured to use a new global optimization technique that is based on linking two non-adjacent nodes instead of cutting links first and then re-wiring them. This method may be referred to as "1-link." To compensate for the extra link, the network topology planning unit 44 may be configured to cut and re-wire one of the newly interconnected nodes between their adjacent neighbors. This constitutes one of the "2-cut" mutations in GA. The total number of such mutations can encompass all pairs of non-adjacent nodes but may be limited to smaller randomly selected subset for faster computation. This increases the number of "2-cut" mutations from originally just two to any controlled number for more efficient optimization of the existing networks. This optimization technique is extremely efficient for global optimization utilizing the above-described methods of avoiding the local optima and escaping from them due to much richer diversity of possible mutations.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause one or more processing devices to perform steps of:
    receiving a first constraint defining a number of nodes (n) to be set in a graph that is to be created, wherein the graph is configured to include a plurality of nodes and a plurality of interconnections, wherein each interconnection is configured to connect a pair of nodes to one another, and wherein the graph is configured to enable each node to reach any other node via one or more interconnections,
    receiving a second constraint defining a number of degrees (d) to be set with respect to each node, wherein the number of degrees d defines the maximum number of interconnections that can be connected to each node,
    dividing the nodes into a number of clusters (C) and a number of sub-clusters (S) in each cluster such that the number of nodes (n) is divisible by C×S,
    upon determining that the graph is developed to an extent where each node is connected to at least one interconnection and every node is reachable by any other node, performing one or more functions with respect to any of the clusters in the graph to improve one or more metrics related to hop count, wherein hop count represents a number of interconnections for one node to reach another node, and
    causing configuration of a network topology for a communications network based on the graph where each node is a network element and each interconnection is a communication link interconnecting corresponding nodes.

2. The non-transitory computer-readable medium of claim 1, wherein the one or more metrics related to hop count include at least one of a first metric and a second metric, the first metric related to an average distance, based on a metric, between each pair of nodes in the graph, the second metric defined as a diameter k and related to a maximum distance, based on the metric, between any pair of nodes in the graph, and wherein the action of improving the one or more metrics includes decreasing the first metric and/or decreasing the second metric.

3. The non-transitory computer-readable medium of claim 1, wherein the number of clusters are identical clusters (C), and wherein the action of performing the one or more functions with respect to the graph includes:
    replicating actions applied to one cluster to the corresponding nodes, intra-cluster interconnections, and inter-cluster interconnections with respect to the other clusters.

4. The non-transitory computer-readable medium of claim 3, wherein the identical clusters include one or more levels of identical sub-clusters.

5. The non-transitory computer-readable medium of claim 1, wherein the action of performing the one or more functions with respect to the graph includes creating a regular graph, where the regular graph is defined by each node being connected to d interconnections.

6. The non-transitory computer-readable medium of claim 5, wherein the action of performing the one or more functions with respect to the graph further includes
    cutting a plurality of existing interconnections in the graph, thereby vacating degrees of multiple nodes, and
    re-wiring one or more mutated interconnections to the degrees vacated by cutting the existing interconnections.

7. The non-transitory computer-readable medium of claim 6, wherein the number of clusters are identical clusters (C), and wherein the action of performing the one or more functions with respect to the graph further includes replicating cutting and re-wiring applied to one cluster to the corresponding nodes and interconnections of the other clusters.

8. The non-transitory computer-readable medium of claim 6, wherein the action of cutting the plurality of existing interconnections in the graphs includes randomly selecting interconnections to cut.

9. The non-transitory computer-readable medium of claim 1, wherein the action of performing the one or more functions with respect to the graph includes adding one or more extra interconnections between one or more pairs of nodes, thereby creating an excess of interconnections with respect to degrees of multiple nodes, removing one or more interconnections from nodes having excess interconnections.

10. The non-transitory computer-readable medium of claim 1, wherein determining that the graph is developed to an extent where each node is connected to at least one interconnection and every node is reachable by any other node includes:

starting the graph with no interconnections, and adding one or more interconnections at a time until the graph is developed to the extent where each node is connected to at least one interconnection and every node is reachable by any other node.

11. The non-transitory computer-readable medium of claim 1, wherein determining that the graph is developed to an extent where each node is connected to at least one interconnection and every node is reachable by any other node includes starting the graph with a circulant architecture.

12. The non-transitory computer-readable medium of claim 1, wherein the one or more metrics are related to one or more of latency, link bandwidth, traffic load, reliability, effectiveness, an ability to operate after a fault is detected, path recovery time, monetary cost, and a weighted combination of factors.

13. The non-transitory computer-readable medium of claim 1, wherein the instructions further enable the processing device to perform one or more of a Genetic Algorithm (GA) with Simulated Annealing (SA) technique and a tabu searching technique to obtain a more globally efficient graph.

14. A system comprising:

a processing device, and a memory device configured to store a computer program having instructions that, when executed, enable the processing device to receive a first constraint defining a number of nodes (n) to be set in a graph that is to be created, wherein the graph is configured to include a plurality of nodes and a plurality of interconnections, wherein each interconnection is configured to connect a pair of nodes to one another, and wherein the graph is configured to enable each node to reach any other node via one or more interconnections, receive a second constraint defining a number of degrees to be set with respect to each node, wherein the number of degrees defines the maximum number of interconnections that can be connected to each node, divide the nodes into a number of clusters (C) and a number of sub-clusters (S) in each cluster such that the number of nodes (n) is divisible by C×S, upon determining that the graph is developed to an extent where each node is connected to at least one interconnection and every node is reachable by any other node, perform one or more functions with respect to any of the clusters in the graph to improve one or more metrics related to hop count, wherein hop count represents a number of interconnections for one node to reach another node, and cause configuration of a network topology for a communications network based on the graph where each node is a network element and each interconnection is a communication link interconnecting corresponding nodes.

15. The system of claim 14, wherein the one or more metrics related to hop count include at least one of a first metric and a second metric, the first metric related to an average distance, in hops, between each pair of nodes in the graph, the second metric defined as a diameter k and related to a maximum distance, in hops, between any pair of nodes in the graph, and wherein the action of improving the one or more metrics includes decreasing the first metric and/or decreasing the second metric.

16. The system of claim 14, wherein the number of clusters are identical clusters (C), and wherein the action of performing the one or more functions with respect to the graph includes:

replicating actions applied to one cluster and one sub-cluster to the corresponding nodes, intra-cluster interconnections, and inter-cluster interconnections with respect to the other clusters and sub-clusters.

17. A method comprising the steps of:

receiving a first constraint defining a number of nodes (n) to be set in a graph that is to be created, wherein the graph is configured to include a plurality of nodes and a plurality of interconnections, wherein each interconnection is configured to connect a pair of nodes to one another, and wherein the graph is configured to enable each node to reach any other node via one or more interconnections, receiving a second constraint defining a number of degrees (d) to be set with respect to each node, wherein the number of degrees d defines the maximum number of interconnections that can be connected to each node, dividing the nodes into a number of clusters (C) and a number of sub-clusters (S) in each cluster such that the number of nodes (n) is divisible by C×S, upon determining that the graph is developed to an extent where each node is connected to at least one interconnection and every node is reachable by any other node, performing one or more functions with respect to any of the clusters in the graph to improve one or more metrics related to hop count, wherein hop count represents a number of interconnections for one node to reach another node, and causing configuration of a network topology for a communications network based on the graph where each node is a network element and each interconnection is a communication link interconnecting corresponding nodes.

18. The method of claim 17, wherein the step of performing the one or more functions with respect to the graph further includes the steps of:

creating a regular graph defined by each node being connected to d interconnections, cutting a plurality of randomly-selected existing interconnections in the graph, thereby vacating degrees of multiple nodes, and re-wiring one or more mutated interconnections to the degrees vacated by cutting the existing interconnections.

19. The non-transitory computer-readable medium of claim 1, wherein the number of clusters (c) is at least four.

20. The non-transitory computer-readable medium of claim 1, wherein the number of clusters (c) is selected to determine a number of repetitions of the performing one or more functions.

* * * * *